United States Patent
Spittle et al.

(10) Patent No.: US 9,654,644 B2
(45) Date of Patent: May 16, 2017

(54) PLACEMENT OF SOUND SIGNALS IN A 2D OR 3D AUDIO CONFERENCE

(71) Applicant: DOLBY LABORATORIES LICENSING CORPORATION, San Francisco, CA (US)

(72) Inventors: Gary Spittle, Hillsborough, CA (US); Michael P. Hollier, San Carlos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 128 days.

(21) Appl. No.: 14/382,825

(22) PCT Filed: Mar. 21, 2013

(86) PCT No.: PCT/US2013/033218
§ 371 (c)(1),
(2) Date: Sep. 4, 2014

(87) PCT Pub. No.: WO2013/142641
PCT Pub. Date: Sep. 26, 2013

(65) Prior Publication Data
US 2015/0055770 A1 Feb. 26, 2015

Related U.S. Application Data

(60) Provisional application No. 61/614,590, filed on Mar. 23, 2012.

(51) Int. Cl.
*H04M 3/56* (2006.01)
*G06F 3/048* (2013.01)
*H04S 7/00* (2006.01)

(52) U.S. Cl.
CPC ............ *H04M 3/568* (2013.01); *G06F 3/048* (2013.01); *H04S 7/302* (2013.01); *H04S 2400/11* (2013.01)

(58) Field of Classification Search
CPC ....................................................... H04M 3/568
(Continued)

(56) References Cited

U.S. PATENT DOCUMENTS 3,959,590 A 5/1976 Scheiber
5,862,230 A 1/1999 Darby
(Continued)

FOREIGN PATENT DOCUMENTS

EP 0289080 2/1993
EP 0386846 9/1996
(Continued)

OTHER PUBLICATIONS

Hiyama, K. et al. "The Optimum Loudspeaker Arrangements for Multichannel Sound System" Technical Report, NHK Laboratories Note Three Dimensional Audio-Visual Systems, Sep. 2002.
(Continued)

*Primary Examiner* — Ahmad F Matar
*Assistant Examiner* — Jirapon Intavong

(57) ABSTRACT

A conference controller (111, 175) configured to place an upstream audio signal (123, 173) associated with a conference participant and a sound signal within a 2D or 3D conference scene to be rendered to a listener (211) is described. The conference controller (111, 175) is configured to set up a X-point conference scene with X different spatial talker locations (212) within the conference scene, X being an integer, X>0; assign the upstream audio signal (123, 173) to one of the talker locations (212); place a sound signal at a spatial sound location (503) within the X-point conference scene; and generate metadata identifying the assigned talker location (212) and the spatial sound location and enabling an audio processing unit (121, 171) to generate a spatialized audio signal based on a set of downstream
(Continued)

audio signals (124, 174) comprising the upstream audio signal (123, 173) and the sound signal.

19 Claims, 8 Drawing Sheets

(58) Field of Classification Search
USPC .................. 379/202.01; 348/14.08; 381/92
See application file for complete search history.

(56) References Cited

U.S. PATENT DOCUMENTS

| | | | |
|---|---|---|---|
| 6,125,175 | A | 9/2000 | Goldberg |
| 7,054,451 | B2 | 5/2006 | Janse |
| 7,489,773 | B1* | 2/2009 | Moran et al. ............ 379/203.01 |
| 7,970,115 | B1* | 6/2011 | Coughlan ............... G10L 21/00 379/202.01 |
| 8,081,762 | B2 | 12/2011 | Ojala |
| 2007/0159924 | A1 | 7/2007 | Vook |
| 2007/0217590 | A1 | 9/2007 | Loupia |
| 2007/0263823 | A1 | 11/2007 | Jalava |
| 2008/0065998 | A1* | 3/2008 | Brown et al. ................. 715/755 |
| 2008/0144794 | A1* | 6/2008 | Gardner .................... 379/202.01 |
| 2008/0215682 | A1* | 9/2008 | Vilis ............................ 709/204 |
| 2008/0219484 | A1 | 9/2008 | Strauss et al. |
| 2008/0260131 | A1 | 10/2008 | Akesson |
| 2008/0298610 | A1 | 12/2008 | Virolainen |
| 2009/0010441 | A1 | 1/2009 | Pallone |
| 2009/0041271 | A1 | 2/2009 | Pallone |
| 2009/0046864 | A1 | 2/2009 | Mahabub |
| 2010/0150359 | A1 | 6/2010 | Knickrehm |
| 2010/0215164 | A1* | 8/2010 | Sandgren et al. ........ 379/202.01 |
| 2010/0316232 | A1 | 12/2010 | Acero |
| 2011/0058662 | A1 | 3/2011 | Yoakum |
| 2011/0096915 | A1 | 4/2011 | Nemer |
| 2011/0196682 | A1 | 8/2011 | Sandgren |
| 2011/0317522 | A1 | 12/2011 | Florencio |
| 2014/0044271 | A1* | 2/2014 | Creamer et al. ................. 381/57 |

FOREIGN PATENT DOCUMENTS

| | | |
|---|---|---|
| EP | 1677515 | 7/2006 |
| EP | 1954019 | 8/2008 |
| WO | 2008/143561 | 11/2008 |
| WO | 2010/040408 | 4/2010 |
| WO | 2013/142668 | 9/2013 |

OTHER PUBLICATIONS

Braasch, Jonas "Architectural Acoustics, Speech Communication and Psychological and Physiological Acoustics: Possibilities and Problems with Auralizations of Classroom Acoustics" Acoustical Society of America, Apr. 2005.

Barnhill, Colin "Remote Listening and Passive Acoustic Detection in a 3-D Environment" The Johns Hopkins University, Sep. 2011.

Haun, M. et al. "3DTel—A Spatial Audio Teleconferencing System" 44th International Conference: Audio Networking, Nov. 2011, AES.

* cited by examiner

PLACEMENT OF SOUND SIGNALS IN A 2D OR 3D AUDIO CONFERENCE

CROSS REFERENCE TO RELATED APPLICATIONS

This application claims priority to U.S. provisional patent application No. 61/614,590 filed 23 Mar. 2012, which is hereby incorporated by reference in its entirety.

BACKGROUND

The present document relates to audio conferences. In particular, the present document relates to methods and systems for setting up and managing two-dimensional or three-dimensional scenes for audio conferences.

One of the deficiencies in current multi-party voice conferences is that voices are typically all rendered to the listeners as a monaural audio stream—essentially overlaid on top of each other and usually presented to the listeners "within the head" when headphones are used. Spatialisation techniques, used e.g. to simulate different people talking from different rendered locations, can improve intelligibility of speech in a voice conference, in particular when there are multiple people speaking simultaneously. The present document addresses the technical problem of designing appropriate two-dimensional (2D) or three-dimensional (3D) scenes for an audio conference which allow a listener to easily distinguish the different talkers of the audio conference. Furthermore, schemes for populating a 2D or 3D conference scene with participants and/or system sounds (e.g. notifications or background music) are described, which allow to reduce the impact on an ongoing audio conference, when adding new participants and/or when inserting system sounds into the conference scene. In addition, appropriate schemes for rendering a conference scene on various rendering devices (such as headphones and/or loudspeaker configurations) are described.

According to an aspect a conference controller configured to place an upstream audio signal associated with a conference participant within a 2D or 3D conference scene is described. The conference scene is to be rendered to a listener. Typically, the listener is positioned at a central position of the conference scene (e.g. at the center of a circle or a sphere, if the conference scene is modeled as a circle or a sphere). The upstream audio signal may be an audio signal generated at a terminal (e.g. a computing device or a telephone device) of the conference participant. As such, the upstream audio signal typically comprises the speech signal of the conference participant. For this reason, the upstream audio signal may also be referred to as a talker audio signal. The conference controller may be positioned (at a central position) within a communication network (e.g. in a so called centralized conference architecture) and/or the conference controller may be positioned at a terminal of a conference participant (e.g. in a so called distributed conference architecture). The conference controller may also be referred to as a scene manager, in the instance of using a 2D or 3D rendering system. The conference controller may be implemented using a computing device (e.g. a server).

The conference controller may be configured to set up a X-point conference scene with X different spatial talker locations within the conference scene, X being an integer, X>0 (e.g. X>1, in particular X=1, 2, 3, 4, 5, 6, 7, 8 or 10). In this context, the conference controller may be configured to calculate the X-point conference scene with X different spatial talker locations based on one or more of the conference scene design rules described in the present document. One such design rule may e.g. be that the X talker locations are positioned within a cone around a midline in front of the head of a listener. Other design rules may relate to an angular separation of the X talker locations. Alternatively or in addition, the conference controller may be configured to select the X-point conference scene with the X different spatial talker locations from a set of pre-determined conference scenes comprising pre-determined speaker locations. By way of example, the set may comprise one or more pre-determined X-point conference scenes with X different pre-determined spatial talker locations. As such, the X-point conference scene may be a pre-determined X-point conference scene with X pre-determined speaker locations.

The conference controller may be configured to set up different conference scenes (e.g. different X-point conference scenes with differently placed talker locations and/or conference scenes with different values of X). The X talker locations of the X-point conference scene are positioned within a cone around a midline in front of the head of the listener. The midline may be an imaginary line starting at a mid point on an imaginary line between the ears of the listener and extending perpendicularly to the imaginary line between the ears of the listener in front of the head of the listener. A generatrix of the cone and the midline form an (absolute) angle which is smaller than or equal to a pre-determined maximum cone angle. The maximum cone angle may be preferably 30°, or narrower such as 20°, or even 15°, depending on the population of the cone.

The conference controller may be further configured to assign the upstream audio signal to one of the X talker locations. By assigning the upstream audio signal to a particular talker location within the conference scene, the conference controller enables a rendering device (e.g. a terminal of the listener of the conference scene) to render the upstream audio signal as if the upstream audio signal emanates from the particular talker location. For this purpose, the conference controller is configured to generate metadata identifying the assigned talker location and enabling an audio processing unit (at a listener's terminal) to generate a spatialized audio signal based on the upstream audio signal. When rendering the spatialized audio signal to the listener, the listener perceives the upstream audio signal as coming from the assigned talker location. The audio processing unit may be positioned within the terminal of the listener, or in the central audio server handling the audio streams. The spatialized audio signal may e.g. be a binaural audio signal which is rendered on headphones or loudspeakers at the terminal of the listener. Alternatively or in addition, the spatialized audio signal may be a multi-channel (surround sound) signal, e.g. a 5.1 or a 7.1 multi-channel signal.

The X talker locations may be placed on a circle or a sphere with the listener being placed in a center of the circle or sphere. Alternative conference scenes may comprise talker locations which are placed on an ellipse or ellipsoid. The listener does not necessarily need to be placed in a center. By way of example, in order to simulate a meeting around a table, wherein the meeting comprises the conference participant and the listener, the listener may be placed at an edge of the geometrical shape forming the conference scene, e.g. at an edge of the circle or sphere, or the ellipse or ellipsoid. In the latter case (as well as in the case where the listener is placed in the center of an ellipse or ellipsoid), the distance between the X talker locations and the listener would be different depending on the talker location.

Two adjacent talker locations of the X talker locations may be separated by at least a minimum angular distance.

The minimum angular distance may be 5° or more. The above mentioned condition may be fulfilled by all pairs of adjacent talker locations of the X talker locations. The minimum angular distance allows the listener to clearly distinguish upstream audio signals which are rendered from the different talker locations. The angular distance between adjacent talker locations of the X talker locations may differ for different talker locations. By way of example, the angular distance between adjacent talker locations of the X talker locations may increase with increasing distance of the adjacent talker locations from the midline. By doing this, the varying capability of a listener to distinguish the source of sounds coming from different angles may be taken into account.

Typically, the conference controller is configured to place a plurality of upstream audio signals associated with a plurality of conference participants within the X-point conference scene. As such, the listener of the conference scene may be enabled to perceive the plurality of upstream audio signals coming from different (up to X different) spatial locations within the conference scene. The conference controller may be configured to assign the plurality of upstream audio signals to the X talker locations in accordance to a sequential order of the plurality of upstream audio signals. The sequential order may refer to a waiting line of the conference controller for placing the upstream audio signals within the conference. Alternatively or in addition, the sequential order of the plurality of upstream audio signals may be based on an order of detection of the plurality of upstream audio signals by the conference controller. In other words, the sequential order of the plurality of upstream audio signals may be associated with the order in which the different conference participants dial into the audio conference, thereby affecting the sequential order in which the corresponding upstream audio signals are detected by the conference controller.

The conference controller may be configured to assign the X talker locations in an order of increasing absolute angular distance from the midline. In other words, the conference controller may assign the first upstream audio signal to the center-most talker location, the second upstream audio signal to the next center-most talker location and so on, until reaching an outer-most talker location. Subject to assigning an upstream audio signal from the plurality of upstream audio signals to the outer-most talker location from the X talker locations, the conference controller may be configured to assign a next upstream audio signal from the plurality of upstream audio signals to the inner-most (also referred to as the center-most) talker location from the X talker locations.

The conference controller may be configured to place a sound signal at a spatial sound location within the X-point conference scene. The sound signal may comprise one or more of the following sound types: a notification sound (e.g. a beep or chime), an announcement, and/or music. Furthermore, the conference controller may be configured to generate metadata identifying the assigned talker location as well as the spatial sound location. The metadata enables the audio processing unit of the listener's terminal to generate the spatialized audio signal for the listener based on a set of downstream audio signals comprising the upstream audio signal and the sound signal. When rendering the spatialized audio signal to the listener, the listener perceives the upstream audio signal as coming from the assigned talker location and the sound signal as coming from the sound location.

The conference controller may be configured to generate a (characterization) tag comprised within the metadata. The tag may enable the audio processing unit at the listener's terminal to identify the sound signal from the set of downstream audio signals received at the audio processing unit and/or to identify the sound type of the sound signal and/or to process the sound signal in accordance to the sound type. In particular, the tag may enable the audio processing unit to select a decoder in accordance to the sound type. By way of example, the set of downstream audio signals may be transferred to the terminal of the listener as a set of encoded downstream audio streams. The terminal (e.g. the audio processing unit of the terminal) may determine that the sound signal comprises music. As a consequence, the terminal may use a decoder which is appropriate for decoding a music signal, thereby increasing the rendering quality of the sound signal.

The sound signal may comprise waiting music. In such a case, the conference controller may be configured to place the sound signal within the X-point conference scene, prior to assigning any upstream signal to one of the X talker locations. As such, the conference controller may be configured to play waiting music to the listener prior to having the listener enter the audio conference. The sound signal may comprise at least two channels (e.g. a left and a right channel) and the conference controller may be configured to assign the at least two channels to at least two spatial sound locations within the X-point conference scene. The at least two spatial sound locations may be symmetric with regards to the midline or the at least two spatial sound locations may be asymmetric with regards to the midline (thereby reducing the risk of acoustic imaging). The at least two spatial sound locations may be positioned within the cone around the midline in front of the head of the listener. In another example, the spatial sound location or locations for the waiting music are different from the X talker locations, e.g. outside of the cone around the midline such as behind the head. This may be beneficial if the waiting music has been added by the listener to the conference. The spatial separation of the waiting music and the talker locations may inform the listener about his/her entry into the conference.

In an embodiment, the sound location corresponds to one of the X talker locations. This may be beneficial e.g. when the sound signal is associated with the upstream audio signal (as when the sound signal announces an event associated with the upstream audio signal, e.g. an entering of the upstream audio signal into the conference or the mute status of the upstream audio signal). In such cases, the sound location may correspond to the talker location of the upstream audio signal. By way of example, the sound signal may indicate an entry of the upstream audio signal into the conference scene or the sound signal may indicate an interruption (e.g. the mute status) of the upstream audio signal. In a further example, the sound signal comprises a notification sound and the conference controller is configured to place the sound signal to a first talker location from the talker locations, prior to assigning the upstream audio signal to the first talker location. This may be used to announce the entry of the upstream audio signal into the conference scene. In yet another example, the conference controller is configured to determine an interruption (e.g. a mute status) of the upstream audio signal assigned to the first talker location and the conference controller may be configured to assign the sound signal to the first talker location (thereby clearly indicating which upstream audio signal has been interrupted).

The sound location may correspond to a fixed (e.g. pre-determined) location within the 2D or 3D conference scene and the conference controller may be configured to place a plurality of subsequent sound signals to the fixed sound location. As such, the listener is enabled to clearly associate a particular location within the conference scene with sound signals.

As indicated above, two adjacent talker locations of the X talker locations may be separated by at least a minimum angular distance. In a similar manner, the sound location may be separated from any one of the X talker locations by at least the minimum angular distance, thereby enabling the listener to clearly distinguish the sound location from the talker locations.

In certain situations (e.g. for background music), the sound location may be positioned outside of the cone around the midline in front of the head of the listener. In particular, the conference controller may be configured to assign the sound signal to at least two sound locations at both sides outside of the cone around the midline in front of the head of the listener. The at least two sound locations may be asymmetric with respect to the midline, thereby reducing the risk of acoustic imaging. In an embodiment, the sound location is positioned behind the head of the listener. This may be particularly relevant when the sound signal comprises music.

The conference controller may be configured to classify the X spatial talker locations into a plurality of clusters, wherein a first of the plurality of clusters comprises at least two spatial talker locations and wherein the at least two spatial talker locations comprised within the first cluster are directly adjacent. In such cases, the conference controller may be configured to assign the signal sound to a plurality of sound locations within the X-point conference scene, wherein the plurality of sound locations are associated with the spatial talker locations comprised within the first cluster. By way of example, the plurality of sound locations may be directly adjacent to the spatial talker locations comprised within the first cluster. As such, the sound signal may be used to provide an acoustic cue to the listener for the position of the first cluster. In particular, the conference controller may be configured to assign a different sound signal to each of the plurality of clusters, thereby enabling the listener to acoustically distinguish the different clusters from one another.

The conference controller may be configured to assign the sound signal to at least two sound locations, wherein the at least two sound locations may be positioned within the cone around the midline in front of the head of the listener. The at least two sound locations may surround one of the spatial talker positions, thereby acoustically emphasizing the one of the spatial talker positions. The conference controller may be configured to pan the sound signal between the at least two sound locations and/or to increase/decrease the volume of the sound signal, thereby further emphasizing the one of the spatial talker positions. In particular, the at least two sound locations may comprise pairs of sound locations at both sides of the one of the spatial talker positions. In such cases, the conference controller may be configured to modify a pan of the sound signal within the pairs of sound locations, thereby modifying a perceived width of the sound signal.

The conference controller may be configured to analyze the upstream audio signal and to modify the sound signal, in order to reduce a spectral masking of the upstream audio signal caused by the sound signal. In particular, the conference controller may be configured to perform a spectral analysis of the upstream audio signal and the sound signal. Based on this, the conference controller may be configured to modify a spectral composition of the sound signal, and to thereby reduce a spectral masking of the upstream audio signal due to the sound signal.

The conference controller may be configured to determine a degree of activity of the upstream audio signal (e.g. by determining an energy of the upstream audio signal). A rendering (or a placement) of the signal sound may be delayed if the degree of activity is above a pre-determined activity level.

The aspects outlined in the present document may relate to 2D conference scenes and/or 3D conference scenes. As such, the aspects concerning the angular arrangement of talker locations and/or sound locations may relate to azimuth angles and/or inclination angles. The azimuth angles may be defined in a horizontal plane comprising the midline. The inclination angles may be defined in a vertical plane comprising the midline. In a 2D conference scene, the sound location(s) may be located at various (possibly different) azimuth angles with respect to the midline. In a 3D conference scene the sound location(s) may be located at various (possibly different) azimuth and/or inclination angles with respect to the midline. The azimuth and/or inclination angles may be different to zero degrees with respect to the midline.

According to another aspect, an audio conferencing system is described. The audio conferencing system comprises a talker terminal configured to generate an upstream audio signal associated with a conference participant (e.g. by recording the speech signal of the conference participant using a microphone). Furthermore, the audio conferencing system comprises a conference controller according to any of the aspects outlined in the present document. The conference controller is configured to assign the upstream audio signal to a talker location and to assign a sound signal to a sound location within a 2D or 3D conference scene. Furthermore, the conference controller is configured to generate metadata identifying the assigned talker location and the sound location. In addition, the audio conferencing system comprises a listener terminal configured to render the upstream audio signal and the sound signal to a listener using the metadata, such that the listener perceives the upstream audio signal as coming from the assigned talker location and the sound signal as coming from the sound location. The assigned talker location and the sound location may be different from one another.

According to a further aspect, a method for placing an upstream audio signal associated with a conference participant and a sound signal within a 2D or 3D conference scene to be rendered to a listener is described. The method comprises setting up a X-point conference scene with X different spatial talker locations within the conference scene, X being an integer, X>0. Furthermore, the method comprises assigning the upstream audio signal to one of the talker locations, and assigning a sound signal to a spatial sound location within the X-point conference scene. In addition, the method comprises generating metadata identifying the assigned talker location and the spatial sound location and enabling an audio processing unit to generate a spatialized audio signal based on a set of downstream audio signals comprising the upstream audio signal and the sound signal. When rendering the spatialized audio signal to the listener, the listener perceives the upstream audio signal as coming from the assigned talker location and the sound signal as coming from the sound location. The assigned talker location and the sound location may be different from one another.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings, wherein FIG. 1a shows a block diagram of an example centralized audio conference system;

As outlined in the introductory section, current multi-party audio conference systems typically overlay the audio signals of a plurality of parties participating in an audio conference into a monaural audio signal which is provided as a single audio stream to each of the participating parties. This makes it difficult for a participating party (when listening) to distinguish the other participating parties from one another (when the other parties are talking). In the present document, multi-party audio conference systems are described which allow for the spatialisation of the plurality of parties of an audio conference, i.e. which allow to place different participating parties of the audio conference at different spatial locations within a two-dimensional (2D) or three-dimensional (3D) audio scene. As a result, a listening party perceives the other participating parties as talking from different respective spatial locations, thereby enabling the listening party to better distinguish the other participating parties.

Figure 1A:
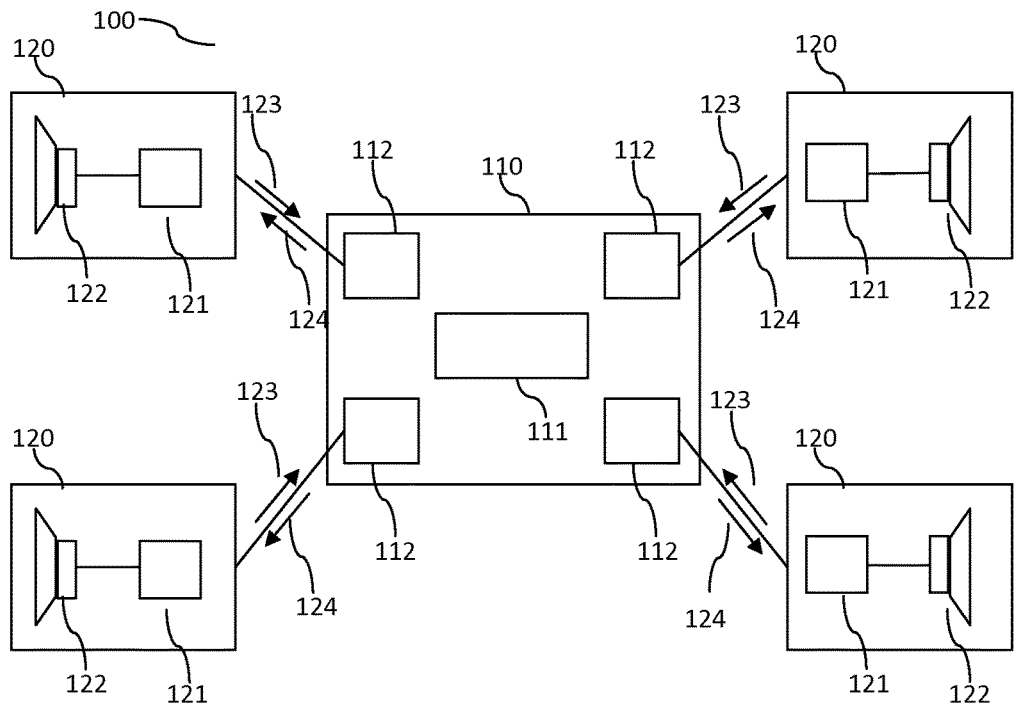
FIG. 1b shows a block diagram of an example distributed audio conference system.

FIG. 1a illustrates an example multi-party audio conference system 100 with a centralized architecture. A centralized conference server 110 receives a plurality of upstream audio signals 123 from a respective plurality of terminals 120. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG 4 audio bitstream. Typically, the upstream audio signal 123 is a mono audio signal. Hence, the centralized conference server 110 (e.g. the audio servers 112 comprised within the conference server 110) may be configured to decode the upstream audio streams (representing the upstream audio signals 123) and to extract optional metadata associated with upstream audio streams.

The conference server 110 may e.g. be an application server of an audio conference service provider within a telecommunication network. The terminals 120 may e.g. be computing devices, such as laptop computers, desktop computers, tablet computers, and/or smartphones; as well as telephones, such as mobile telephones, cordless telephones, desktop handsets, etc. The conference server 110 comprises a central conference controller 111 configured to combine the plurality of upstream audio signals 123 to from an audio conference. The central conference controller 111 may be configured to place the plurality of upstream audio signals 123 at particular locations within a 2D or 3D conference scene and generate information regarding the arrangement (i.e. the locations) of the plurality of upstream audio signals 123 within the conference scene.

Furthermore, the conference server 110 comprises a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), as well as the information regarding the arrangement of the plurality of upstream audio signals 123 within the conference scene. The information regarding the arrangement of the plurality of upstream audio signals 123 within the conference scene is typically provided by the conference controller 111 which thereby informs the audio server 112 (or processing module/thread) on how to process the audio signals. Using this information, the audio server 112 generates a set of downstream audio signals 124, as well as corresponding metadata, which is transmitted to the respective terminal 120, in order to enable the respective terminal 120 to render the audio signals of the participating parties in accordance to the conference scene established within the conference controller 111. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG 4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120. It should be noted that the metadata may be sent to the terminal 120 as a separate stream, e.g. with a timestamp for synchronization with the downstream audio stream. This means that a terminal 120 that does not require the metadata, or that does not know how to decode the metadata can still process the basic downstream audio streams (and render the audio signals to the listener at the terminal 120). In other words, the set of downstream audio signals 124 and the metadata may be encoded in a downward compatible way, such that terminals 120 which are not enabled for the rendering of 2D or 3D conference scenes may still be used to render the downstream audio signals (e.g. in a mixed form).

As such, the audio servers 112 may be configured to perform the actual signal processing (e.g. using a digital signal processor) of the plurality of upstream audio streams and/or the plurality of upstream audio signals, in order to generate the plurality of downstream audio streams and/or the plurality of downstream audio signals, as well as the metadata describing the conference scene. The audio servers 112 may be dedicated to a corresponding terminal 120 (as illustrated in FIG. 1a). Alternatively, an audio server 112 may be configured to perform the signal processing for a plurality of terminals 120, e.g. for all terminals 120.

It should be noted that the upstream audio signal 123 of a terminal 120 may also be referred to as a talker audio signal 123, because it comprises the audio signal which is generated by the conference participant that is talking at the terminal 120, e.g. talking into a microphone of the terminal 120. In a similar manner, the set of downstream audio signals 124 which is sent to the terminal 120 may be referred to as a set of auditor audio signals 124, because the set 124 comprises the plurality of audio signals which the participant at the terminal 120 listens to, e.g. using headphones or loudspeakers.

The set of downstream audio signals 124 for a particular terminal 120 is generated from the plurality of upstream audio signals 123 using the central conference controller 111 and the audio server 112, e.g. the audio server 112 (or the processing module or the software thread) for the particular terminal 120. The central conference controller 111 and the audio server 112 generate an image of the 2D or 3D conference scene as it is to be perceived by the conference participant at the particular terminal 120. If there are M participants of the audio conference, i.e. if there are M terminals 120 connected to the conference server 110, then the conference server 110 may be configured to arrange M groups of (M−1) upstream audio signals 123 within M 2D or 3D conference scenes (M being an integer with M>2, e.g. M>3,4,5,6,7,8,9,10). More precisely, the conference server 110 may be configured to generate M conference scenes for the M terminals 120, wherein for each terminal 120 the remaining (M−1) other upstream audio signals 123 are arranged within a 2D or 3D conference scene.

By way of example, the conference server 110 may make use of a master conference scene which describes the arrangement of the M conference participants within a 2D or 3D spatial arrangement. The conference server 110 may be configured to generate a different perspective of the master conference scene for the M conference participants (i.e. for the M terminals 120 of the M conference participants, respectively). By doing this, it can be ensured that all of the conference participants have the same relative view of where the other conference participants are being placed. This is notably the case, if the M conference participants are positioned "around a table" (e.g. a circle) within the master conference scene, and if the listeners in the M "individual" conference scenes are positioned at an edge of the "table" (e.g. on the circle).

In another example, the conference server 110 may assign the talker locations of the conference scene in accordance to a sequential arrival of the conference participants to the conference scene. The talker locations may be assigned from an inner-most talker location to an outer-most talker location as described in the present document. As a result of such sequential order, the conference participants may be placed at the same talker locations within the conference scenes destined for different listeners. The conference server may make use of this similarity (or identity) of conference scenes in order to save computational complexity.

In a further example, the conference server 110 may make use of a single conference scene for all the M conference participants and place all of the M conference participants at pre-determined talker locations within the single conference scene. In such a case, all the M conference participants would perceive the same 2D or 3D conference scene. When providing the single conference scene to a particular terminal 120 (for a particular conference participant being the listener), the talker location of the particular conference participant may be left empty. This example may be efficient to implement as it only requires the management of a single conference scene by the conference server 110.

The M conference scenes typically differ in that a different individual of the M participants is placed within a center of the conference scene. By way of example, the conference scene for a first terminal 120 typically assumes the first terminal 120 to be in the center of the conference scene and the other (M−1) terminals to be placed around the first terminal 120. As such, the audio server 112 for the first terminal 120 generates a set of up to (M−1) downstream audio signals 124 (and corresponding metadata) from the (M−1) upstream audio signals 123 other than the upstream audio signal 123 from the first terminal 120. This terminal specific set of downstream audio signals 124 describes the conference scene for the first terminal 120, wherein the first terminal 120 is typically placed in the center location of the conference scene. In a similar manner, a set of downstream audio signals 124 is generated for the other terminals 120.

In an embodiment, the central conference controller 111 is in charge of the control of the audio conference, wherein the audio servers 112 manipulate the upstream audio signals 123 and generate the sets of downstream audio signals 124 for their corresponding terminals 120, subject to the control of the central conference controller 111. By way of example, the central conference controller 111 may not process the bearer information (i.e. the actual audio data within the upstream audio signals 123), but may process the signaling information (e.g. addressing information of the called party and the calling party, capabilities of the terminals 120, etc.). The central conference controller 111 may use the signaling information to set up an audio conference. The actual mixing of the upstream audio signals 123, the generation of a set of downstream audio signals 124, the generation of appropriate metadata which defines a terminal specific conference scene, as well as the decoding/encoding of the audio signals from/into audio bitstreams may be performed by the audio servers 112, e.g. using digital signal processors.

A terminal 120 receives its terminal specific set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and the corresponding metadata. Furthermore, the audio processing unit 121 may be configured to generate a mixed binaural audio signal for rendering by the audio transceiver 122, wherein the mixed binaural audio signal reflects the terminal specific conference scene designed at the conference server 110 for this terminal 120. In other words, the audio processing unit 121 may be configured to analyze the received metadata and to place the received set of downstream audio signals 124 into the terminal specific conference scene. As a result, the conference participant perceives a binaural audio signal which gives the conference participant at the terminal 120 the impression that the other participants are placed at specific locations within a conference scene.

The generation of a binaural audio signal for each one of the downstream audio signals 124 may be performed by processing the (mono) downstream audio signal through a spatialisation algorithm. Such an algorithm could be the filtering of the samples of the downstream audio signal using a pair of head related transfer functions (HRTFs), in order to provide a left and right ear signal. The HRTFs describe the filtering that would have naturally occurred between a sound source (of the downstream audio signal) positioned at a particular location in space and the ears of the listener. The HRTFs include all the cues for the binaural rendering of the sound, such as interaural time difference, interaural level difference and spectral cues. The HRTFs depend on the location of the sound source (i.e. on the talker location of the downstream audio signal). A different, specific pair of HRTFs may be used for each specific location within the conference scene. Alternatively, the filtering characteristics for a particular location can be created by interpolation between adjacent locations that HRTFs are available for. Hence, the terminal 120 may be configured to identify the talker location of a downstream audio signal from the associated metadata. Furthermore, the terminal 120 may be configured to determine an appropriate pair of HRTFs for the identified talker location. In addition, the terminal 120 may be configured to apply the pair of HRTFs to the downstream audio signal, thereby yielding a binaural audio signal which is perceived as coming from the identified talker location. If the terminal 120 receives more than one downstream audio signal within the set of downstream audio signals 123, the above processing may be performed for each of the downstream audio signals and the resulting binaural signals may be overlaid, to yield a combined binaural signal.

It should be noted that alternatively or in addition to the generation of a mixed binaural audio signal, the terminal 120 (e.g. the audio processing unit 121) may be configured to generate a surround sound (e.g. a 5.1 or a 7.1 surround sound) signal, which may be rendered at the terminal 120 using appropriately placed loudspeakers 122. Furthermore, the terminal 120 may be configured to generate a mixed audio signal from the set of downstream audio signals 124 for rendering using a mono loudspeaker 122.

In contrast to conventional monaural audio conference systems, where a single mixed audio signal is transmitted from the conference server to a terminal, in the audio conference system 100 of FIG. 1a a set of up to (M−1) downstream audio signals 124 and corresponding metadata are transmitted (e.g. as bitstreams) from the conference server 110 to each terminal 120. In view of bandwidth limitations of an underlying communications network, it may be beneficial to limit the number of audio signals (e.g. bitstreams) which are transmitted within a set of downstream audio signals 124. In the following, it is assumed that N is the number of downstream audio signals 124 comprised within a set of downstream audio signals 124 for a particular terminal 120, with N being an integer, e.g. N<M. It should be noted that N may be dependent on the terminal 120 and/or on the communication network between the terminal 120 and the conference server 110, i.e. N may be different for different terminals 120. By way of example, the terminal 120 may be a mobile telephone connected to the conference server 110 via a wireless network. In such cases, it may be beneficial to select a relative small number of downstream audio signals for transmission to the mobile telephone, e.g. N=1, or to change the parameters of a codec used for generating the downstream audio streams.

As outlined above, the conference server 110 receives up to M upstream audio signals 123 which are placed within a 2D or 3D conference scene. The conference server 110 may determine and analyze a degree of talker activity of the M upstream audio signals 123 at a plurality of succeeding time instants (and/or at a plurality of succeeding frames). The degree of talker activity of an upstream audio signal may be based on the energy (e.g. means square energy) of the upstream audio signal. A conference participant (and the corresponding upstream audio signal) may be classified as an "active" talker (at a particular time instant) or as an "inactive" talker (at the particular time instant), based on the degree of talker activity. This classification may change from time instant to time instant. The conference server 110 may then determine a set of downstream audio signals 124 (and associated metadata) for a particular conference participant (i.e. for a particular terminal 120) by taking into account the degree of talker activity. The selection of the upstream audio signals 123 which are inserted into the set of downstream audio signals 124 may change from time instant to time instant (as a function of the degrees of talker activity). By way of example, the conference server 110 may be configured to only consider the upstream audio signals 123 of "active" talkers at a particular time instant for the set of downstream audio signals 124.

As a result of taking into account a degree of talker activity, the conference server 110 may be configured to reduce the required bandwidth for transmitting the sets of downstream audio signals 124 to the different terminals 120. In case of a single active talker, the set of downstream audio signals 124 might only comprise a single audio signal (i.e. the upstream audio signal of the active talker), thereby significantly reducing the bandwidth on the communication link between the conference server 110 and the terminal 120. The set of downstream audio signals 124 may nonetheless comprise (or be associated with) metadata indicating the spatial location of the active talker(s). Hence, the terminal 120 may nonetheless be enabled to render the audio signals of the active talkers in a spatialized manner. The metadata may change from time instant to time instant, along with the change of talker activity. Hence, the metadata may indicate at each time instant, the spatial arrangement of the active talker(s) reflected within the set of downstream audio signals 124.

As a further measure to reduce bandwidth, discontinuous transmission may be used from the source devices (i.e. from a terminal 120) to the conference server 110. By way of example, the terminal 120 may be configured to determine the degree of talker activity based on the audio signal recorded at the terminal 120. If the degree of talker activity is low (e.g. below a pre-determined energy threshold), the terminal 120 may be configured to discontinue the transmission of the upstream audio signal 123 from the terminal 120 to the server 110, thereby reducing the required bandwidth. Hence, talkers may be assigned to the same spatial locations within the conference scene, but will only cause a conflict if the talkers talk at the same time.

Figure 1B:
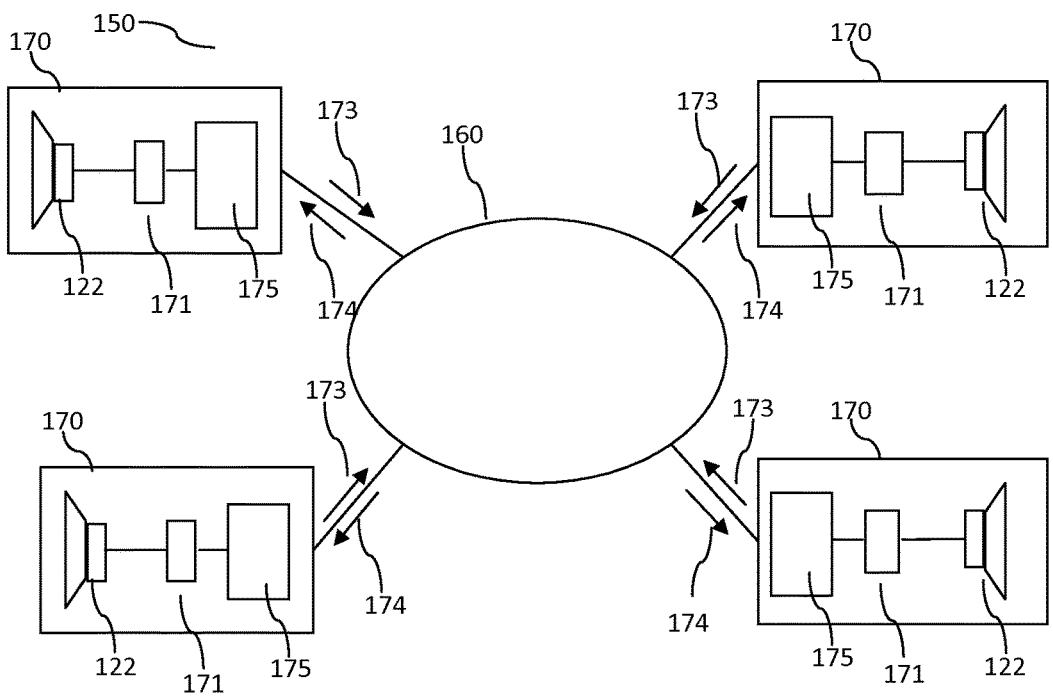

FIG. 1a illustrates a 2D or 3D conference system 110 with a centralized architecture. 2D or 3D audio conferences may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

In a distributed architecture, a terminal 170 is configured to send its upstream audio signal 173 (e.g. as a bitstream) to the other participating terminals 170 via a communication network 160. For this purpose, the terminal 170 may use multicasting schemes and/or direct addressing schemes of the other participating terminals 170. Hence, in case of M participating terminals 170, each terminal 170 receives up to (M−1) downstream audio signals 174 (e.g. as bitstreams) which correspond to the upstream audio signals 173 of the (M−1) other terminals 170. The local conference controller 175 of a receiving terminal 170 is configured to place the received downstream audio signals 174 into a 2D or 3D conference scene, wherein the receiving terminal 170 is typically placed in the center of the conference scene. The audio processing unit 171 of the receiving terminal 170 is configured to generate a mixed binaural signal from the received downstream audio signals 174, wherein the mixed binaural signal reflects the 2D or 3D conference scene designed by the local conference controller 175. The mixed binaural signal is then rendered by the audio transceiver 122.

It should be noted that the centralized conference system 100 and the decentralized conference system 150 may be combined to form hybrid architectures. By way of example, the terminal 170 may also be used in conjunction with a conference server 110 (e.g. while other users may use terminals 120). In an example embodiment, the terminal 170 receives a set of downstream audio signals 124 (and corresponding metadata) from the conference server 110. The local conference controller 175 within the terminal 170 may set up the conference scene provided by the conference server 110 as a default scene. In addition, a user of the terminal 170 may be enabled to modify the default scene provided by the conference server 110.

Alternatively or in addition, the components of the conference server 110 may be distributed within a network, e.g. in order to reduce the bandwidth required by the audio conference. By way of example, the central conference controller 111 may be positioned at a first position (e.g. a central position), and the audio servers 112 may be positioned in one or more other different positions within a network. This may be beneficial, in order to select positions for the audio servers 112 which reduce the overall network capacity required for handling the audio conference. It may e.g. be beneficial to place the audio servers 112 according to the regional distribution of the participating terminals 120 of the audio conference. The communication between the audio servers 112 and the central conference controller 111 may be limited to signaling information (without the need to exchange the actual audio data).

In the following, reference will be made to the centralized conference system 100. It should be noted, however, that the disclosure is also applicable to the decentralized architecture 150 and any hybrid forms of conference systems.

Figure 2:
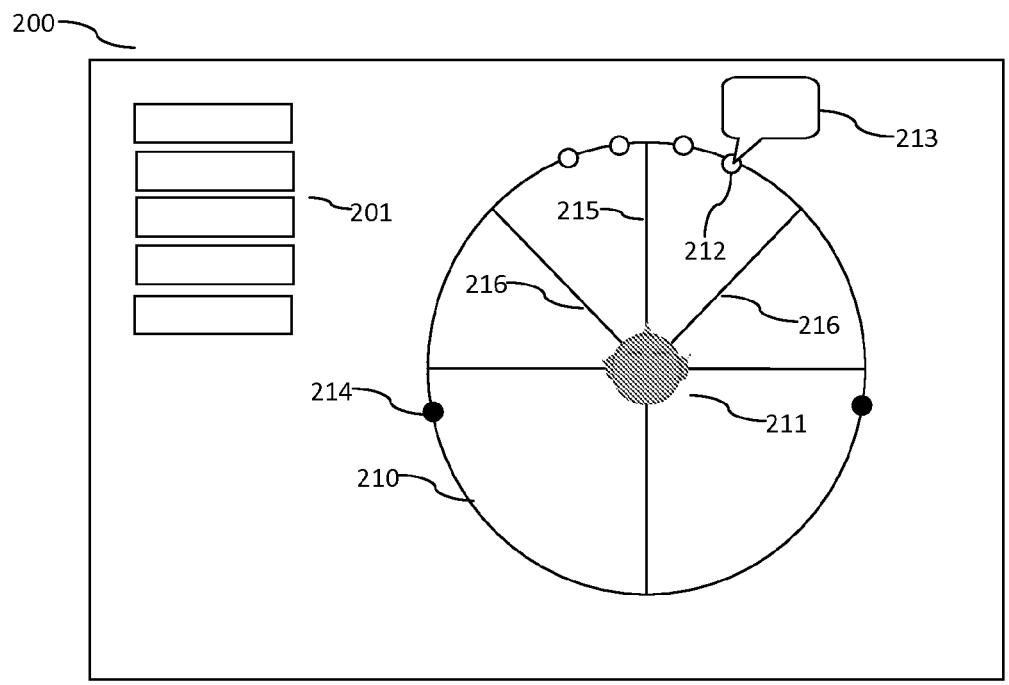
FIG. 2 shows an example Graphical User Interface (GUI) for a scene manager of an audio conference system.

FIG. 2 illustrates a Graphical User Interface (GUI) 200 of a conference scene which may be provided at the conference server 100 and/or at the terminals 120. If provided at a terminal 120, the GUI 200 may enable a participant to modify the conference scene as perceived at the terminal 120. In an embodiment, the GUI 200 enables a chairperson of an audio conference to place the conference participants within a conference scene. The GUI 200 may indicate the participants 201 of the audio conference. The participants 201 may correspond to the originators of the audio signals comprised within a set of downstream audio signals. As such, the GUI 200 may indicate up to (M−1) participants 201. Furthermore, the GUI 200 may illustrate the conference scene 210. In FIG. 2 a 2D (two-dimensional) conference scene is illustrated, e.g. as a circle. It should be noted that the GUI 200 may be adapted to illustrate a 3D (three-dimensional) conference scene, e.g. as a sphere. The listener 211 (i.e. the terminal 120 which receives the terminal specific set of downstream audio signals 124) may be placed by default in the center of the scene 210. The GUI 200 may be configured to allow for a modification of the location of the listener 211. Furthermore, the GUI 200 provides a plurality of talker locations 212 (which are illustrated as empty dots 212 in FIG. 2). The plurality of talker locations 212 may be pre-defined or may be selected by a user of the GUI 200. The talker locations 212 may be assigned to one or more of the conference participants 201. This may be done automatically (e.g. based on the metadata received along with the set of downstream audio signals 124). Alternatively or in addition, the GUI 200 may allow for a user specific assignment (e.g. using a "drag and drop" operation of the indicated participants 201 to the talker locations 212). The assignment of a participant 201 and the talker location 212 may be indicated, e.g. using a pop-up window 213. In addition, the GUI 200 may allow to indicate and/or to modify additional sound locations 214 (which are illustrated as filled dots 214 in FIG. 2). Such sound locations 214 may be used to render sounds other than audio signals (typically voice signals) of the participants, e.g. conference notifications and/or music.

The conference system 100 may be configured to automatically determine the talker locations 212 of a conference scene 210 based on one or more of a plurality of placement rules. These placement rules are based on perceptual tests where talkers 201 were placed at different locations 212 within a conference scene 210 and where the preferred rendering locations 212 for a listener 211 were determined. These perceptual experiments have shown that A listener 211 typically prefers that talkers 201 in a conference are spatialised in front of the head of the listener 211, and preferably not behind the head of the listener 211.

More precisely, a listener 211 typically prefers that talkers 201 are placed within a cone in front of the listener's head within approximately −30° to 30° from a center line 215 in front of the listener 211, and preferably even in a narrower cone, i.e. in a cone defined by angles smaller than +/−30° from the center line 215. It has been observed that it may be uncomfortable for a listener 211 to listen to a talker 201 for a long time, if the talker is placed at large eccentricities, e.g., at angles significantly greater than 20° from the centre line 215. Hence, it may be beneficial to select the talker locations 212, such that the talker locations 212 are positioned within a cone in front of the head of a listener 211. The cone may be such that the angle between a center axis 215 of the cone and a generatrix 216 of the cone is smaller than a pre-determined maximum cone angle, e.g. 15°, 20° or 30°. The angles mentioned in the present document refer to angles with respect to the center line 215 in front of the head of the listener 211. Negative angles refer to angles in a counter clockwise direction and positive angles refer to angles in a clockwise direction from the center line 215.

The ability to separate talkers 201 from each other typically requires some angular separation, to assist talker identification and intelligibility, of approximately 5° degrees of angle or greater. Hence, it may be beneficial to select the talker locations 212, such that the angular separation between two adjacent talker locations 212 is greater than a minimum angular distance of e.g. 5°.

Completely symmetric rendering around the midline 215 (also referred to as the center line) is not preferred. The reason for this is that a symmetric rendering may sometimes result in imaging effects directly in front of the listener 211, e.g. when a conversation is occurring between two talkers 201 placed at symmetric points 212 with regards to the midline 215. Hence, it may be beneficial to arrange the talker locations 212 in an asymmetric manner with regards to the center line 215.

Asymmetric rendering has the additional advantage of providing a relatively "balanced" scene 210 when talkers 201 are added to the scene 210 due to additional participants 201 calling into the audio conference. By way of example, a default conference scene 210 comprising a maximum of six pre-defined talker locations 212 which are arranged in a symmetric manner around the midline 215 is significantly unbalanced across the midline 215, if only 1, 3, or 5 talkers 201 are placed within the scene (i.e. when the six pre-defined talker locations 212 are not yet filled with actual talkers 201).

Some or all of the above mentioned rules may be used to define default scenes 210 with default talker locations 212. Furthermore, some or all of these rules may be used to specify a deterministic behavior of an automatic scene manager (e.g. embodied by the central conference controller 111 and/or the local conference controller 175). The scene manager may be configured to automatically place participants 201 into a conference scene 210, as the participants 201 enter the conference scene 210. In other words, the scene manager (running on the central conference controller 111 and/or on the local conference controller 175) may be configured to automatically determine the talker location 212 of a new conference participant 201, based on a default conference scene 210 and based on the participants 201 which are already placed within the conference scene 210.

In the following an example three-point scene manager (populating a default three-point conference scene) and an example six-point scene manager (populating a default six-point conference scene) are described. It should be noted that using the placement rules described in the present document, general X-point scenes and corresponding X-point scene managers may be specified (with X being an integer, X=1, 2, 3, 4, 5, 6, 7, 8, 9, 10, e.g. X=M−1, for conferences having M conference participants placed at different spatial locations).

Figure 3A:
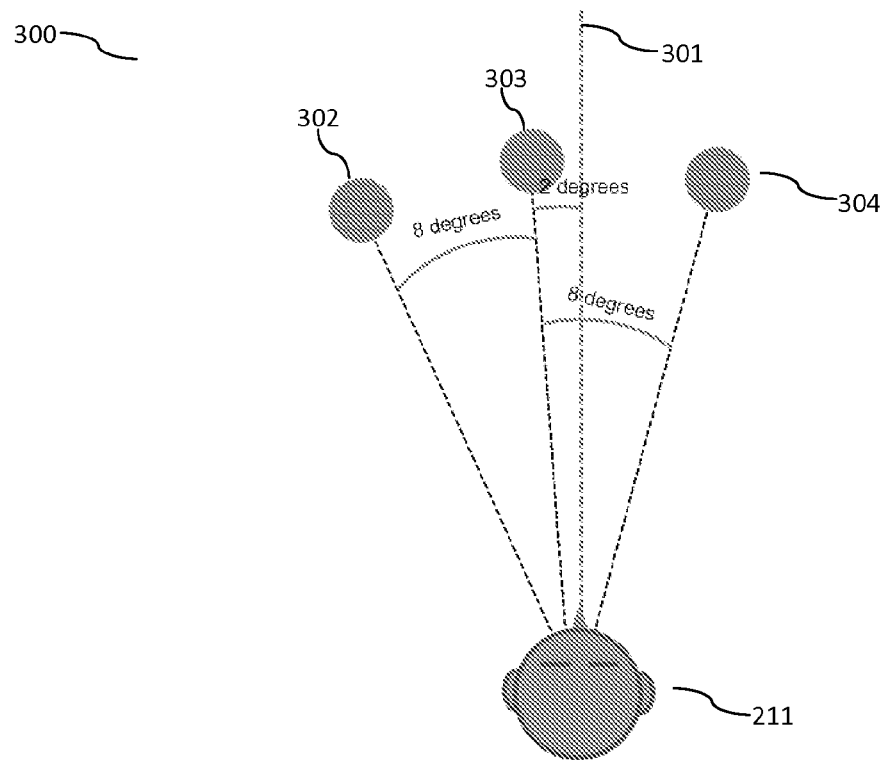
FIGS. 3a and 3b illustrate example audio conference scenes.

FIG. 3a illustrates an example three-point scene 300, where a central talker location 303 is offset by 2° from the midline 301 and where the surrounding pair of talker locations 302, 304 is offset from the central talker location 303 by +/−8°, respectively. In the illustrated example, each sound source, i.e. each talker location 302, 303, 304, has the same perceived radial distance from the listener 211.

In more general terms, a three-point scene may have the following characteristics:

In a preferred implementation of the three-point scene, the conference participants 201 are assigned to one of three fixed talker locations 302, 303, 304. The actual talker location that a conference participant 201 is assigned to may depend on the sequential order in which the conference participants 201 are joining the audio conference.

A central talker location 303 (the central point of the scene) is placed at a central angle from −5° to 5° around the midline 301 of the scene 300. The preferred implementation is not at a central angle of 0°, but at a central angle from 1° to 5° or from −1° to −5°. As a result of positioning the central talker location 303 off the midline 301, the overall conference scene may be asymmetric with regards to the midline 301.

The other two points of the scene (i.e. the other talker locations 302, 303) can be placed within a cone in front of the person anywhere between −30° to 30°. The preferred implementation of the other talker locations 302, 303 is within a cone between −15° to 15°.

The other two talker locations 302, 303 should be placed on either side of the central talker location 303 and separated from the central point of the talker location 302, 303 by at least 5° degrees of angle.

The preferred spacing of the talker locations should be asymmetric with regards to the midline 301. This can be achieved by placing the other talker locations 302, 304 in a symmetric manner with respect to the centre point 303 (assuming that the central point 303 is not placed at 0°).

Figure 3B:
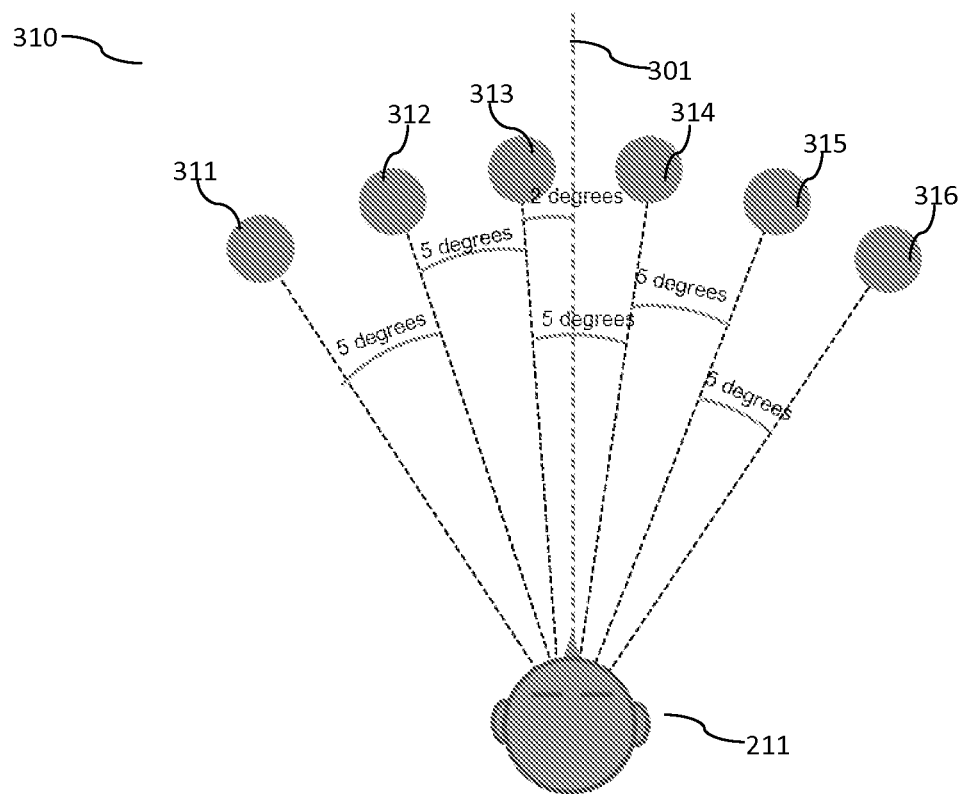

FIG. 3b shows an example six-point scene 310, where each talker 201 is separated from each other by 5° and where the entire scene 310 is rotated by a fixed angle of 2° with respect to the midline 301. In other words, the talker locations 311, 312, 313,314, 315, 316 of the six-point scene 310 are symmetric with regards to the midline rotated by an angle of 2°. Each sound source, i.e. each talker location 311, 312, 313,314, 315, 316 has the same perceived radial distance from the listener 211. The six-point scene 310 allows talkers to be allocated to six different fixed points 311, 312, 313,314, 315, 316. It should be noted that other configurations of a six-point scene 310 may be specified using the placement rules provided in the present document.

FIGS. 3a and 3b show scenes 300, 310, where the talker locations are placed at fixed angles apart from one another and wherein the arrangement of talker locations is rotated from the midline 301 by a fixed angle. It should be noted, however, that the talker locations do not need to be placed at fixed angles from each other, as long as the minimum angle is greater than a minimum preferred angle or a minimum angular distance, e.g. 5°. Also, the radial distance between adjacent talker locations may vary to provide additional distance cues.

A scene manager (e.g. a central or local conference controller) may use a pre-determined X-point scene (e.g. the 3-point scene 300 and/or the 6-point scene 310 shown in FIGS. 3a and 3b, respectively), in order to place talkers into a conference scene, as each talker enters the conference. An X-point scene, with X=(M−1), may be used for a conference having a total number of M conference participants, such that each of the M conference participants may be assigned to a different talker location.

Typically, the actual number of talkers in an audio conference is not known when the conference starts. Hence, the scene manager may be configured to add conference participants to the pre-determined X-point scene, when the conference participants call in. In particular, the scene manager may be configured to assign a particular location within the pre-determined X-point scene to a joining participant. For this purpose, the scene manager may make use of a set of rules for adding (or removing) conference participants into the pre-determined X-point scene. Example placement rules may be

- to place a new conference participant on an available talker location, which is as close as possible to the midline 301 of the X-point scene;
- to ensure a maximum balance of the assigned talker locations with regards to the midline 301 of the X-point scene and/or with regards to a center location 303 of the X-point scene;
- to fill up empty talker locations which have been left empty by conference participants which have left the X-point scene.

The above mentioned placement rules may be used alone or in combination, in order to place a new participant into an X-point scene. As such, the new participants may be added to the conference scene from the inner points of the X-point scene outwards, and/or in such a way as to maximize the balance around the centre talker location 303 of the X-point scene or the midline 301 of the scene. If the number of talkers (M−1) in the conference scene exceeds the number of talker locations X of the X-point scene, the scene manager may be configured to assign multiple talkers to the same talker location. For the three-point scene 300 illustrated in FIG. 3a, upstream participants could be placed by the scene manager as follows:

Participant 1: placed at −2° (i.e. at the talker location 303),
Participant 2: placed at 6° (i.e. at the talker location 304),
Participant 3: placed at −10° (i.e. at the talker location 302),
Participant 4: placed at −2° (i.e. at the talker location 303),
Participant 5: placed at 6° (i.e. at the talker location 304),
and so forth.

Please note that in the present document, angular values are either denoted by the symbol "°", the term "degrees" or possibly both. For the six-point scene 310, new conference participants could join the scene as follows (using FIG. 3b as a reference):

Participant 1: placed at −2° (i.e. at the talker location 313),
Participant 2: placed at 3° (i.e. at the talker location 314),
Participant 3: placed at −7° (i.e. at the talker location 312),
Participant 4: placed at 8° (i.e. at the talker location 315),
Participant 5: placed at −12° (i.e. at the talker location 311),
Participant 6: placed at 13° (i.e. at the talker location 316),
Participant 7: placed at −2° (i.e. at the talker location 313),
and so forth.

A particular six-point scene 310 which has shown to have particularly good properties with regards to the ability of a listener 211 to distinguish the different participants placed at the different talker locations 311, 312, 313, 314, 315, 316 makes use of the following angles for the talker locations 311, 312, 313, 314, 315, 316. This particular six-point scene satisfies the constraint of minimum separation between adjacent talker locations, stays within a +−20° cone, and is slightly asymmetric with regards to the midline 301:

talker location 314 (e.g. for the first participant) at 2° from the midline 301;
talker location 313 (e.g. for the second participant) at −5° from the midline 301;
talker location 315 (e.g. for the third participant) at 9° from the midline 301;
talker location 312 (e.g. for the fourth participant) at −12° from the midline 301;
talker location 316 (e.g. for the fifth participant) at 16° from the midline 301;
talker location 311 (e.g. for the sixth participant) at −19° from the midline 301.

The above mentioned description of default scenes has been limited to an example three and an example six point scene 300, 310. It should be noted that other numbers of points within a scene are also possible, ranging from a two-point scene manager up to an (M−1)-point scene (for a conference with M participants). The number of points within a scene is typically only limited by the design and placement rules described in the present document. Furthermore, it should be noted that the indicated values of angles are examples only. The selected angle values may vary by +/−1 degree or +/−2 degrees. As such, the angle values described in the present document should be understood as approximate indications.

It should be noted that instead of or in addition to assigning multiple talkers to the same talker location (e.g. as the number of talkers (M−1) exceeds the number X of talker locations), the scene manager may be configured to upgrade the conference scene to a conference scene having a higher number of talker locations (e.g. from a 3-point scene to a 6-point scene). By way of example, the scene manager (e.g. the conference server 110) may prompt an organizer of the audio conference (located at one of the terminals 120) whether the conference scene should be upgraded (e.g. subject to a premium fee). If accepted, the scene manager may transfer the conference participants to the upgraded conference scene. By doing this, the size of the conference scene can be flexibly adapted to the actual number of conference participants. Furthermore, conference scenes with different sizes may be provided by a conference service provider as a value added service.

It should be noted that alternatively or in addition to a horizontal distribution of talkers within a conference scene, the conference scene may be extended vertically, notably if the endpoint is capable of 3D rendering. For example, the same azimuth angular separation may be used between different talker locations, but with an elevation separation of e.g. 10 degrees. In this way, layers of talkers can be created, thereby further increasing the possibilities for spatial separation of different talkers within a conference. In more general terms, the plurality of talker locations within a conference scene may be described by an azimuth angle $\phi$ (with a horizontal plane in front of the head of the listener 211, wherein the horizontal plane comprises the midline 215) and an inclination angle $\theta$ (within a vertical plane in front of the head of the listener, wherein the vertical plane comprises the midline 215). The conference scene may comprise a plurality of rows of talker locations (each talker location within a row being described by a different azimuth angle $\phi$ and a same inclination angle $\theta$), wherein each row is positioned at a different inclination angle $\theta$.

In the following, various schemes for reducing the required network resources for an audio conference are outlined. As discussed above, the audio conference systems described in the present document are directed at allowing a binaural rendering (or a multi-channel rendering) of a conference scene at the terminals 120 of an audio conference. The binaural rendering should allow for the placement of a talker in the conference scene within a 2D or 3D space. This is in contrast to the mixing (i.e. adding) of two (mono) audio signals together into a single (mono) signal (which does not allow for a spatial separation of the two audio signals). The binaural rendering of the talkers in a conference scene could be implemented at various locations within the conference system. The example conference system 100 of FIG. 1a makes use of a centralized conference server 110 which generates metadata that specifies how a corresponding set of downstream audio signals 124 is to be combined in order to form a specific conference scene. A binaural signal which reflects the specific conference scene is determined at a respective terminal 120, thereby allowing the binaural rendering to flexibly adapt to the rendering characteristics of the audio transceiver 122 at the terminal 120 (also referred to as an endpoint). Typically, the generation of a binaural signal is based on the set of downstream audio signals 124 and is based on the placement information comprised within the metadata. Furthermore, the generation of a binaural signal may be dependent on the type of audio transceiver 122 (e.g. loudspeaker or headphone). A centralized conference server 110 may not be aware of the type of audio transceiver 122 used in a terminal 120, and it may therefore be beneficial to perform the generation of the binaural signal at the terminal 120.

By way of example, the endpoint 120 may need to dynamically adapt during an audio conference. For example, the listener 211 at the endpoint 120 may start the audio conference by using a binaural headset. At a later stage, the listener 211 may be joined in the room by a second conference participant, so they disconnect the binaural headset and use the endpoint loudspeakers and microphone so they can both participate. Consequently, the rendering of the conference scene would need to be adapted in order to switch from headphones to loudspeakers. As such, the endpoint 120 may be configured to adapt the rendering of the 2D or 3D conference scene to the audio transceiver 122 used at the endpoint 120.

Hence, it may be beneficial to transmit a set of up to (M−1) individual downstream audio signals (corresponding to the (M−1) talkers within an audio conference) and associated metadata to a terminal 120. If the conference scene is limited to X talker locations, then multiple talkers may have been assigned to the same talker locations. The audio signals of talkers which have been assigned to the same talker locations may be mixed, in order to form a downstream audio signal for the respective talker location. As such, a set of up to X downstream audio signals (corresponding to the X talker locations of an X-point conference scene) and associated metadata may be sent to the terminal 120. The terminal 120 may be configured to render the 2D or 3D X-point conference scene using the set of downstream audio signals and the associated metadata. Furthermore, the terminal 120 (e.g. the terminal 170) may be configured to modify the conference scene using a local conference controller 175 (e.g. to swap talkers and talker locations, to shift the conference scene, etc.). However, in order to enable the terminal 120 to perform a binaural or a multi-channel rendering of the X-point conference scene, a set of up to X individual downstream audio signals and associated metadata have to be transmitted to the terminal 120.

Alternatively, the binaural signal for a terminal 120 may be generated at the conference server 110. This may be beneficial with regards to the required bandwidth on the link between the conference server 110 and the terminal 120, as the transmission of a binaural signal (i.e. a stereo signal) may require less bandwidth than the transmission of the set of up to (M−1) downstream audio signals and the corresponding metadata (which are typically transmitted in the form of a bitstream e.g. a G.711, a G722.2 (AMR-WB, Adaptive Multi-Rate—Wide Band), an MPEG2 or an MPEG 4 bitstream). On the other hand, the generation of the binaural signal at the conference server 110 allows for less flexibility with regards to the audio transceiver 122 used at the destination terminal 120 and/or with regards to the manipulation of the conference scene at the destination terminal 120 (also referred to as the listener terminal 120).

When performing the generation of a binaural signal at the terminals 120 (as outlined in the context of FIGS. 1*a* and 1*b*), the number of audio signals of a set of downstream audio signals 124 may be limited to a maximum number of N simultaneous active audio signals (wherein N is smaller than the number of participants M, e.g. N<M−1 and/or wherein N is smaller than the number X of talker locations within the X-point scene, i.e. N<X). This may be due to bandwidth limitations on a link between the conference server 110 and the terminal 120. In other words, in order to limit the bandwidth between the server 110 and the endpoints 120, it may be necessary to limit the maximum number of simultaneous active streams (i.e. audio signals) being sent from the server 110 to the endpoints 120. Thus, even though conference participants 201 are placed at (M−1) discrete points 121 (e.g. M=7) within a conference scene 210, the number of streams that are simultaneously delivered to the endpoints 120 may be limited to N, e.g. N=1, 2, or 3, simultaneous active streams even when implementing a (M−1)-point scene 310. The maximum number of simultaneous active streams N may be selected, in order to limit a required bandwidth between the server 110 and the endpoints 120, while at the same time providing a perceptually pleasing rendering of the multi-party conference. For the case of N=1, only one downstream audio signal 124 (e.g. as an audio stream) is sent from the server 110 to the endpoint 120 and rendering or mixing may be performed in the server 110. In this case, the rendering at the terminal 120 may be limited to a mono output. For N=2, a maximum of two simultaneous audio signals 124 (e.g. as audio streams) may be sent from the server 110 to the endpoint 120 for rendering. For N=3, a maximum of three simultaneous audio signals 124 (e.g. as audio streams) may be sent from the server 110 to the endpoint 120. In each of the above cases, the server 110 may mix some streams when the number of simultaneous talkers (M−1) within the conference is greater than the predefined maximum N. In an embodiment for a three- or six-point scene 300, 310, the scene manager may be configured to limit the number of streams to be sent to an endpoint 120 to N=3 streams. In other words, the number of audio signals within a set of downstream audio signals may be limited to N=3.

It should be noted that the N downstream audio signals may be provided along with corresponding metadata. As such, the terminal 120 may be enabled to render the N downstream audio signals in a spatialized manner. By way of example, even if N=1, the single downstream audio signal may be transmitted along with metadata indicating where to place the single downstream audio signal in a 2D or 3D spatial conference scene. If only a single talker is active, the downstream audio signal (corresponding to the upstream audio signal of the single active talker) could be placed at the talker location of the single talker. This is different from a conventional mono rendering (with no spatialization). Only in case of multiple talkers (and N=1), the spatial disambiguation of the multiple talkers would be lost, due to a mixing of the multiple talkers into a single downstream audio signal.

As outlined above, the conference server 110 may comprise a central conference controller 111 and a plurality of audio servers 112. The conference controller 111 may be configured to define the placement of conference participants in the conference scene. Furthermore, the conference controller 111 may be configured to determine whether the audio signals of one or more conference participants need to be mixed, which audio signals should be mixed and a priority of the mixing operations. In other words, the conference controller 111 may be configured to

- determine the need for mixing the audio signals of one or more conference participants. For this purpose, the number of conference participants M and the maximum number N of audio signals within a set of downstream audio signals 124 may be compared.
- determine which audio signals should be mixed. In this context, the conference controller 111 may make use of one or more mixing rules. For example, it may be preferable to have talkers which are placed at greater angles within the conference scene to be mixed with a higher priority than the talkers which are rendered near the midline 301 of the conference scene. In other words, it may be beneficial to avoid the mixing of talkers which are placed in the front of a listener 211. This is due to the fact that a listener 211 typically observes movements within a conference scene more, if the movement occurs directly in front of the listener 211 compared to a movement which occurs at a greater angle. Furthermore, it may be assumed that the first people who join in a conference are likely to be the organizers of the conference. As outlined above, the scene manager may be configured to distribute the talker locations 212 within a conference scene 210 from a center location towards an outer location in accordance to the order of joining the conference. Hence, it may be assumed that the organizer of a conference is located at a center location, and it may therefore be desirable to provide the organizer of a conference with a preferential separation (i.e. with a lower risk of being mixed with other conference participants).
- determine a placement for the mixed talkers. For this purpose, the conference controller 111 may apply one or more placement rules (e.g. the one or more placement rules described in the present document). In other words, the conference controller 111 may make use of a predefined strategy of where the mixed talkers are placed in the conference scene. By way of example, the conference controller 111 may comprise a plurality of predefined X-point conference scenes, with different values of X. If it is determined that the number of allowed audio signals N is smaller than the required number of audio signals (M−1), with M being the number of conference participants, then the conference controller 111 may be configured to place the mixed audio signals in accordance to a predefined N-point conference scene. In other words, the conference controller 111 may be configured to select a conference scene, wherein the number of talker locations within the conference scene may be adapted to the number N of audio signals which can be transmitted individually to a terminal 120.

Figure 4:
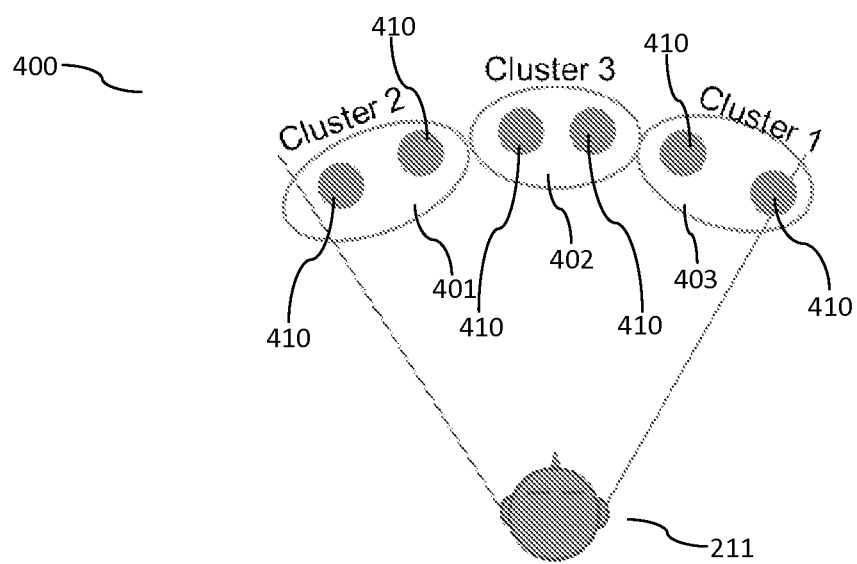
FIG. 4 illustrates example clusters of an audio conference scene.

As such, there are at least two elements to a mixing strategy used by the conference controller 111. These elements are to determine which talkers are to be mixed together and to determine where the final spatial location for the mixed talkers lies within the conference scene. By way of example, for a six-point scene, the conference controller 111 may be configured to identify adjacently placed angles (i.e. talker locations) for mixing. This allows for a reduction from a six-point scene down to a three-point scene (if N=3). This is illustrated in an example six-point conference scene 400 in FIG. 4. If there are only four people speaking in the scene 400, then the preferred mixing strategy could be to mix cluster 1 403 and/or cluster 2 401 if talkers at these locations 410 are active, in order to reduce the number of audio signals to the maximum number of N=3. Only if this is not sufficient talkers within Cluster 4 402 may be mixed at the server 110. As will be outlined in further detail below, the mixing is typically performed based on an analysis of talker activity. This means that at each of a plurality of time instants, the number of active upstream audio signals may be determined. If the number of active upstream audio signals at a particular time instant is greater than N, some or all of the active upstream audio signals may be mixed (in accordance to the mixing rules described in the present document).

In yet other words, the conference controller 111 may be configured to mix audio streams (i.e. mix audio signals) based on the number of streams which are present within the conference and based on a maximum number of allowable streams. If the number of streams exceeds N streams, then a mixing strategy is applied to limit the number of streams 124 which are transmitted to an endpoint 120. The mixing strategy may comprise the mixing rule to always mix large eccentricities first. Furthermore, the conference controller 111 may be configured to place the mixed stream at one of the two (or more) pre-defined talker locations where the mixed streams had originally been placed. Alternatively, the mixed stream may be placed somewhere between the two (or more) pre-defined talker locations. In a preferred implementation a mixed stream is placed midway between the talker locations of the streams that have been mixed. The conference controller 111 may perform the mixing of talkers that are placed near the midline 301 of a conference scene (e.g. cluster 3 402 of FIG. 4) only as a last resort (i.e. with reduced priority).

As discussed above, the mixing of the audio signals of the conference participants is typically only required, if the number of active talkers (i.e. M−1, for a conference having M participants) exceeds the maximum number N of allowed audio signals within a set of audio signals 124 and/or if the number of active talkers (M−1) exceeds the number of talker locations 212 within the X-point scene (i.e. M−1>X). By way of example, the mixing within a six-point scene is only required when there are 4 or more talkers. In this instance, the scene is "busy" and therefore small movements of sounds will be difficult to notice. In other words, as the number of participants in a conference increases, i.e. as the conference becomes "busy", spatial movements of sounds which results from the mixing of audio signals tend to be less perceivable by a listener 211.

The audio servers 112 may be configured to implement the mix of audio signals as defined by the conference controller 111. In other words, the audio server 112 may process the audio signals and perform the merging of the audio signals. In yet other words, in a packet based communication network the audio servers 112 may make decisions on a packet by packet basis of the audio signals, whether to implement a mix in order to reduce the total number of streams. By way of example, the audio servers 112 may be configured to determine the degree of activity of the M upstream audio signals at each of a plurality of succeeding time instants (wherein the time instants may e.g. coincide with the packets of an audio bitstream). The conference controller may analyze the degrees of activity and decide on a selection and/or mixing of upstream audio signals to bring down the total number of downstream audio signals to the allowed maximum of N. Furthermore, the conference controller may provide the placement information regarding the N downstream audio signals. The actual mixing and the generation of the metadata may then be performed by the audio servers 112 based on the decisions and placement information provided by the conference controller.

The above examples for limiting the number of audio streams towards a terminal 120 to a maximum number of N audio streams are based on a fixed selection of (possibly mixed) audio streams which are transmitted to the terminal 120. Typically, the number of active talkers within a conference is limited. In an ideal and highly organized audio conference, there would be only one active talker, while the other conference participants would be listening. As such, it might be sufficient in such a highly organized audio conference to only transmit a single audio stream (i.e. the audio stream of the active talker) along with metadata indicating the placement of the active talker within the conference scene. As another participant located at a different talker location becomes the active talker, the single transmitted audio stream may be changed to be the audio stream corresponding to the new active talker, along with metadata indicating the new talker location. As such, all the different talkers may be rendered at the terminal 120 at their respective talker locations, while at the same time only transmitting a single audio stream (and related metadata).

In more general terms, the conference controller 111 may be configured to dynamically select the set of N downstream audio signals 124 based on a degree of talker activity of the X (mixed or unmixed) audio signals placed within an X-point conference scene. At a particular time instant, the conference controller 111 may select the N most active ones of the X (mixed or unmixed) audio signals for transmission towards the terminal 120 (along with the relevant metadata for placing the selected audio signals within the conference scene). The selection of audio signals for transmission to the terminal 120 may be repeated for succeeding time instants (e.g. every 1 second or every 100 ms). As such, the number X of spatial locations which can be rendered at a terminal 120 may be maintained, while at the same time providing a reduced number N of audio streams which are transmitted to the terminal 120. In an embodiment, the (N−1) most active ones of the X (mixed or unmixed) audio signals are selected for transmission towards the terminal 120. As such, the (N−1) most active talkers may be rendered in a spatialized manner at the terminal 120.

In addition to placing participants of an audio conference into a 2D or 3D conference scene, audio conference systems typically make use of notification sounds and/or background music. The use of musical sounds such as hold music, notifications of people joining or leaving a conference and other informational tones are frequently used in conference solutions. Interactive Voice Response (IVR) solutions use recorded or synthesized speech to make announcements into the conference. Example announcements include phrases such as "Please wait while you are connected to the conference", or "Please enter your access code".

These sounds are typically passed through the same audio signal processing modules as the voice signals of the audio conference. This may result in musical sounds being impaired in various ways: Stereo music signals or multi-channel (e.g. 5.1) music signals may be reduced to a single channel (i.e. to a mono music signal) from initially two channels or multi-channels (e.g. 5.1 channels); the use of voice codecs may introduce artifacts into the musical sound when the tonal components of the music are poorly represented in the coded domain, thereby yielding a distorted musical sound; the voice codecs may be bandwidth limited in order to allow for an efficient data transfer through the network, thereby re-coding the musical sound from e.g. 44.1 kHz down to 8 kHz sample rate; the musical sound may be subjected to spectral changes due to noise reduction and equalization components of the conference system that are tuned for speech. These noise reduction and equalization components may impact the noise like characteristics of percussive sounds within music. Hence, it is desirable to ensure an appropriate rendering of sound signals (e.g. notifications and/or music) within an audio conference. It should be noted that for this purpose, a listener's terminal 120 may be configured to handle audio streams encoded in different formats, at different data rates and/or different sample rates (e.g. audio streams comprising speech signals using a first codec and audio streams comprising music signals in a different codec).

A further technical problem, when mixing sounds into an existing speech stream within a conference scenario, is the impact of the sounds on the intelligibility of the speech signals. As a result of energetic masking, certain frequencies of the speech signals may be masked by the sound signal, thereby making the speech signals less comprehensible. As such, there is a need for an appropriate adjustment of the informational sounds (e.g. an appropriate adjustment of the level of the sounds), such that the sounds can be heard and interpreted by a listener 211, without masking the speech signal of a talker within the conference scene.

A further aspect regarding conference sounds is the timing and positioning of the sounds within the scene which is typically determined by the event triggering the informational sound. As a result, a conference sound may have a disturbing effect on the talkers/listeners within a conference scene. Hence, there is a need for providing less intrusive ways of informing the participants in a conference call about an event using informational sounds.

In order to allow for an appropriate processing of a conference sound, it is proposed to make use of an audio categorization of the different types of audio signals used within an audio conference. By way of example, an audio signal may be tagged as a voice signal (e.g. the upstream signals 123 coming from the terminals 120 may be tagged to be voice signals), or as a notification sound or as a musical sound. If the scene manager is provided with additional information related to the audio content of the different audio signals, the scene manager can ensure that the correct processing is applied to an audio signal, rather than treating all audio signals the same (e.g. as voice signals). The categorization tag can be embedded into a bitstream (representing an audio signal) as metadata. Alternatively, any other known method (using e.g. in-band or out-of-band signals) of transferring additional information alongside the audio signal may be used in order to provide the categorization tag. The scene manager can interpret the categorization tag provided alongside the audio signal and determine the appropriate processing based on the categorization tag. The appropriate processing may include determining an appropriate spatial position for rendering a particular audio signal within the conference scene;
    selecting an appropriate audio codec for the audio signal;
    applying appropriate post processing to the audio signal (e.g. equalisation and dynamic range compression in order to enhance the loudness and compensate for the rendering acoustics. This processing is typically different for music than for speech. In case of music or sounds, the audio stream may bypass the noise reduction algorithms applied to the speech streams).

The appropriate processing applied by the scene manager (comprised e.g. in the conference controller 111) may be different based on the existing content of the conference scene and based on the category of the audio signal.

For example, the conference systems 100, 150 of FIGS. 1a and 1b may be configured to include up to M participants (i.e. up to M terminals 120) into an audio conference. The M terminals 120 generate M respective upstream audio signals 123, which may be tagged e.g. as "voice signals". Furthermore, the conference systems 100, 150 may be configured to include K (with K being an integer, e.g. K=1, 2, 3, 4, 5) sound signals into the audio conference. These sound signals may be tagged e.g. as "notification sounds" and/or "musical sounds". The tags may be transmitted alongside with the upstream audio signals/sound signals as metadata (e.g. embedded within the bitstream). Alternatively or in addition, the conference server 110 may be configured to identify the upstream audio signals 123 coming from the terminals 120 to be "voice signals" (solely based on the origin of the audio signals 123). The sound signals may originate from the conference server 110 itself, such that the conference server is typically aware of their characteristic (i.e. of the fact that the sound signal is a "musical sound" or a "notification sound"). By way of example, if the sound signal is coming from an IVR (interactive voice response) component of the conference system, the conference server can intelligently tag the sound signals as speech as the conference server knows what has been synthesized or streamed from a recorded file.

As such, the conference server 110 may be configured to populate a conference scene with one or more of the upstream audio signals 123 and, as well as with one or more sound signals (as and when required). The resulting conference scene may be communicated to a respective terminal 120 via the set of downstream audio signals 124, which comprises voice signals (of the talkers) as well as sound signals. The voice signals and the sound signals comprised within the set of downstream audio signals 124 may be appropriately tagged, in order to allow for an appropriate processing of the audio signals at the respective terminal 120.

As indicated above, the manager of a conference scene (e.g. implemented within the conference server 110) may be configured to place sound signals within the conference scene. Sound signals may include e.g.:
    short beeps and/or chimes that indicate a change in state of the conference, such as a new participant joining the conference;
    segments of speech that provide information or instructions that need to be followed, such as "Please enter your access code", "You will now join the conference";
    segments of music that are used while waiting to join a conference or when a listener's stream has been temporarily deactivated, disconnected or muted; and/or
    background/ambience music of a conference scene.

In a typical mono conference system, these sounds are either mixed into the existing voice stream within the conference or replace the entire voice stream, thereby causing an interruption of the audio conference. Ideally, the sound signals should be placed into the conference without causing an interruption and/or without making an active talker difficult to understand. In the present document, it is proposed to ensure the above mentioned goals by making use of a rendering scheme that uses spatial separation between sound signals and the voice signals of the conference participants.

Hold or waiting room music may be rendered in a far superior way compared to existing typical conference systems by ensuring that the music is not processed incorrectly. Stereo music can be encoded using a transform based codec without the typical impairments of a speech based codec, such as CELP (Code Excited Linear Prediction). A stereo sound signal may be inserted into the conference, i.e. the two channels of the stereo sound signal may be streamed into the conference. The conference control logic (e.g. the conference server 110) may be configured to determine whether the receiving endpoint 120 is capable of receiving multiple channels of audio data, and if not, mix down the stereo sound signal to a single mono stream. The sound signal (or the mixed sound signal) may be encoded using an appropriate music codec, thereby ensuring an appropriate quality level and audio bandwidth.

Figure 5A:
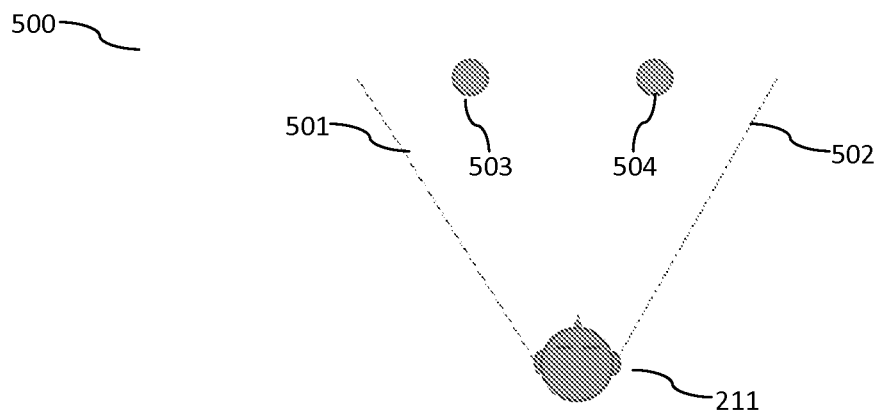
FIGS. 5a to 5i illustrate example placement schemes for audio notifications/audio signals in an audio conference scene.

The encoded sound signal may then be transmitted to the endpoint 120 alongside with metadata which indicates that the encoded sound signal is a music signal. In case of a multi-channel endpoint 120, the received music streams can be rendered to specific locations within the audio scene, as shown in FIG. 5a for standard stereo sounds and in FIG. 5b using asymmetric rendering. The selection of appropriate asymmetric sound locations may be performed in accordance to the selection of (asymmetric) talker locations, as described above.

Figure 5B:
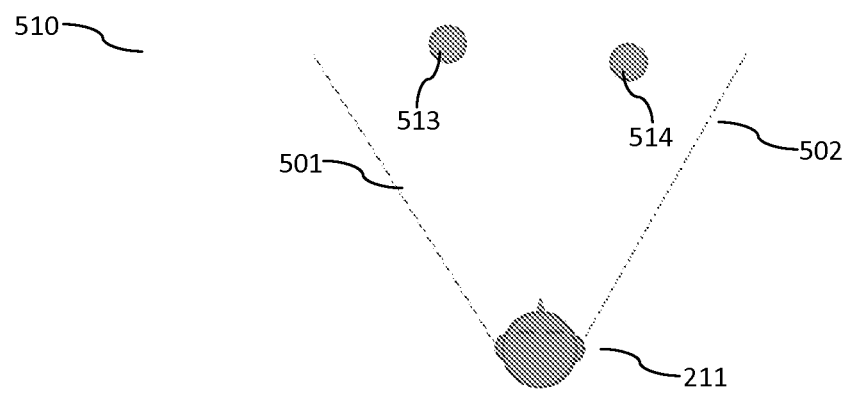

Hence, the conference server 110 may be configured to provide spatialized waiting room music to a participant 211 prior to entering a conference scene. The waiting room music may be placed at two locations 503, 504 in front of the listener 211, as illustrated in the scene 500 of FIG. 5a. The two locations 503, 504 are preferably located within a cone in front of the listener 211, wherein the cone is defined by the generatrix 501, 502. The two locations may be used to render a left and a right channel of the waiting room music, respectively. The two locations may be arranged in a symmetric manner, as illustrated in FIG. 5a or the two locations 513, 514 may be arranged in an asymmetric manner, as illustrated in FIG. 5b. The two locations 513, 514 of FIG. 5b are asymmetric with respect to their angles and with respect to their distances to the listener 211. It should be noted that in another example, the two locations 513, 514 may have the same distance to the listener 211, while still having different angles with respect to the midline 215. When using an asymmetric arrangement, acoustic imaging effects may be reduced. The conference server 110 may be configured to appropriately encode the waiting room music, in order to provide for a sufficiently high audio quality. Furthermore, the conference server 110 may be configured to inform the terminal 120 of the listener 211 that the received set of audio signals 124 comprises music signals (e.g. using metadata). In addition, the conference server 110 may be configured to inform the terminal 120 of the listener 211 about the spatial positions 503, 504, 513, 514 of the received set of audio signals 124 (e.g. using metadata).

In a further example, the listener may be waiting to join a meeting and while waiting, the listener may decide to listen to his/her own local music. The local audio stream (comprising the listener's own music) may be mixed into the scene. The conference audio may be placed at a different location than the listener's own music so that the listener is aware when the conference is starting. By way of example, the listener's own music may be placed behind the listener as illustrated e.g. in FIG. 5f. Being able to mix in local audio may be a useful component of a scene that has been created at the endpoint, i.e. at the terminal of the listener.

When there are active voice signals within the conference, the placement of sound signals may be done using similar logic. That is, the conference server 110 may be configured to place sound signals (e.g. notifications or background music) into a conference scene comprising one or more talkers. When a (mono) notification sound, such as a beep or a chime, is placed into the auditory conference scene, it is desirable that the insertion of the notification sound has minimal impact on the active voice signals, while ensuring that the notification is heard. In other words, a sound signal should be inserted into a conference scene such that the sound signal is perceived, while at the same time causing reduced impact on the voice conversations of the conference participants.

Figure 5C:
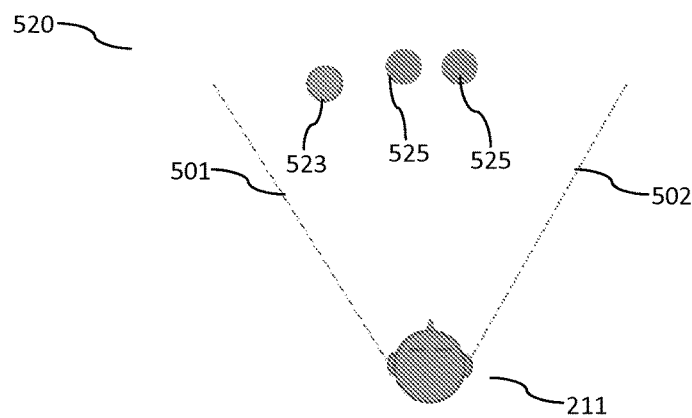

In the present document, it is proposed to use spatial separation of the sound signals from the talker locations, in order to ensure that a listener 211 can clearly distinguish the sound signal from the conversations of the conference participants. An example conference scene 520 comprising a location 523 for sound signals is illustrated in FIG. 5c. In the conference scene 520, the spatial location 523 is separated from the talker locations 525. The angular separation of the sound location 523 and an adjacent talker location 525 may follow the above mentioned rules regarding the placement of talkers within a conference scene (e.g. at least 5° degrees). One possibility could be to make use of a predefined X-point scene (e.g. a 3-point scene 300 or a 6-point scene 600) and to use one of the X talker locations of the predefined X-point scene for rendering the sound signal. By way of example, the scene manager may be configured to attribute a location of the X-point scene to the sound signal in accordance to the distribution scheme outlined above (wherein the sound signal is treated as an entering participant).

It should be noted, however, that when placing the sound signal at a location which depends on the number or participants that have already joined the conference, it may occur that the spatial location 523 of the sound signals (e.g. of the notifications) changes, depending on the number of participants which have already been placed within the conference scene 520. This is clear, when considering the distribution schemes outlined in the context of FIGS. 3a and 3b, where the talker locations assigned to a participant depend on the number of participants which have already been placed within the conference scene. This could be disturbing to conference participants as the notifications of new joiners would alternate from side to side. On the other hand, changing sound locations could be beneficial, as the joining notification could be used to indicate the spatial position of the new participant, i.e. the sound location for a joining notification could be used to indicate the spatial location of the joining participant.

Alternatively or in addition, the spatial location of a sound signal could be based on spatial locations in the conference that have already been allocated to participants of the conference. The conference server 110 may be configured to determine and/or use talker activity of the participants and/or the mute status of participants, in order to determine whether the location of a participant could be temporarily borrowed for a sound signal. By way of example, the conference server 110 may be configured to determine that a participant at a first talker location is in mute. This could be determined by detecting the absence of an upstream voice signal coming from the terminal of the participant. In this case, the conference server 110 may place a (time-limited) sound signal at the first talker location.

Although it may be disturbing to the listener 211 of a conference scene 520 if the notification sound location 523 is not locked to a fixed and/or consistent spatial location, it may sometimes be preferable to deliberately place the notification sound to different spatial locations. As already indicated above, the notification sound that indicates a new joiner to the conference scene may provide additional cues to a listener 211, if the sound is placed into the scene 520 at the same location that the voice signal of the new joiner will be assigned to. This would inform the listener 211 of where the new joiner's voice will be heard from once the new owner is talking. Another example for the benefit of sound signals with changing sound locations could be a sound signal indicating that the participant at the particular location (from which the sound signal emanates) has muted. In general terms, it may be beneficial that sound signals which are associated with a particular participant of the voice conference are placed at the same location within the conference scene as the particular participant of the voice conference.

Figure 6A:
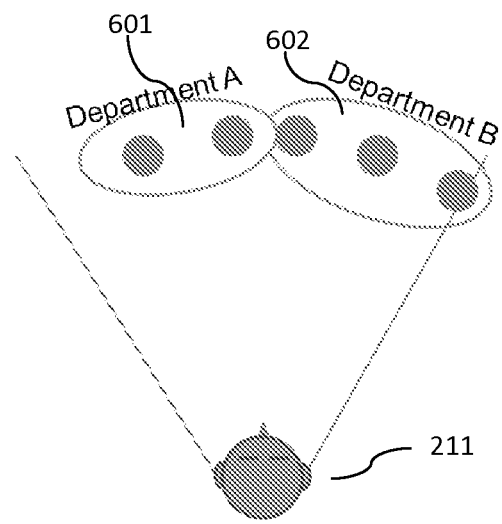
FIGS. 6a to 6b show example conference scenes with clustered talker locations.
Figure 6B:
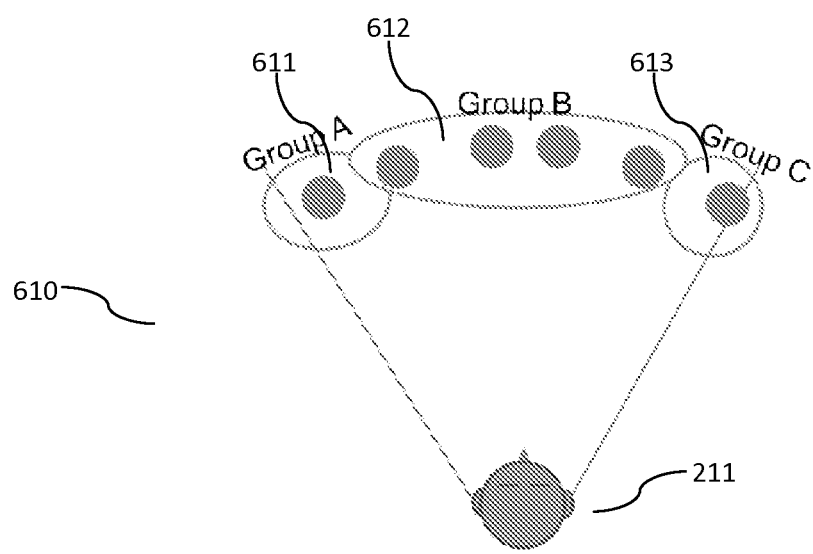

Sound signals which are associated with particular participants of the voice conference and which make use of the spatial locations of the particular participants are not restricted to a single point within the scene, but may be used to identify regions of the conference scene. By way of example, the conference participants may be grouped into clusters 601, 602 or groups 611, 612, 613 as illustrated in FIGS. 6a and 6b. For example, a scene 610 may be used to place participants from three departments within a company, such as finance, engineering and marketing. Each department may be assigned to its own cluster that spans a region 611, 612, 613 within the scene 610. Participants from each department could be allocated to locations within their corresponding region 611, 612, 613. This could be used to provide a listener 211 with audible information regarding the affiliation of a talker (simply by distinguishing the rough spatial direction of the talker). A cluster/group specific notification sound could be rendered with a spatial width around a target location, wherein the spatial width and the target location describe the region 611, 612, 613 of the respective cluster. By way of example, notification sounds could be different for each cluster/group and/or could be rendered at a location that identifies which cluster the participant is allocated to. It should be noted that the segmentation of the conference scene is not restricted to departments, but could also be extended, for example to different companies, families, teams etc.

Figure 5D:
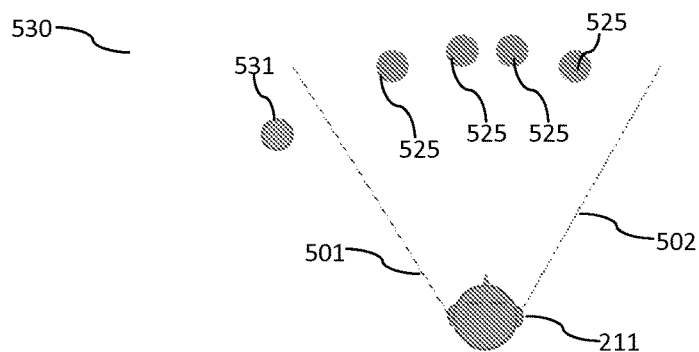

Alternatively or in addition, the conference scene may specify a location for sound signals (e.g. for all sound signals or for all sound signals which are not associated with a particular participant or a particular group of participants). This is illustrated in the conference scene 530 of FIG. 5d, where a spatial location 531 is reserved for some or all notifications. This may be preferable, because a fixed location may be easily identified by the listener 211 as the spatial position of system notifications, thereby reducing the disturbance to the listener 211 due to the notification. In the example conference scene 530 of FIG. 5d, the fixed spatial location 531 for sound signals is placed outside of the cone 501, 502 used for talker locations 525. This may be beneficial to further decrease the risk that a sound signal may disturb the conversation of the conference participants. Another benefit is that if the sound signals are located outside the cone 501, 502, the same stream of audio and spatial location metadata may be sent to all participants, giving an efficiency and complexity benefit.

Figure 5E:
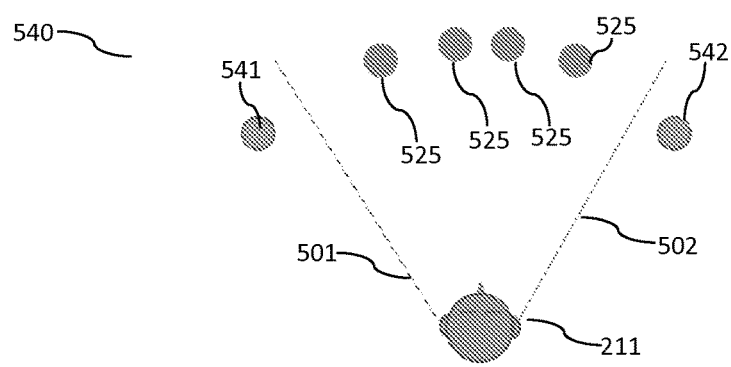

Notifications tend to be reasonably infrequent in audio conference systems, so that notifications should not cause an imbalanced sound or audible holes in the conference scene 530 due to large angular regions with no sound (between the sound location 531 and an adjacent talker location 525). However, a preferred approach may be to have the notifications rendered at two (e.g. slightly asymmetric) locations 541, 542 on each side of the midline of the conference scene 540, as shown in FIG. 5*e*. As indicated above, an asymmetric rendering may be preferable in view of acoustic imaging effects. By rendering a notification at two spatial locations on opposite sides of the listener 211, the conference scene 540 remains balanced, even in case of notifications, thereby reducing the risk that a conversation between the participants of the audio conference is disturbed. In addition to potentially providing a more balanced scene, this would allow the use of "stereo" notifications, providing a richer sound content to the listener 211.

Figure 5F:
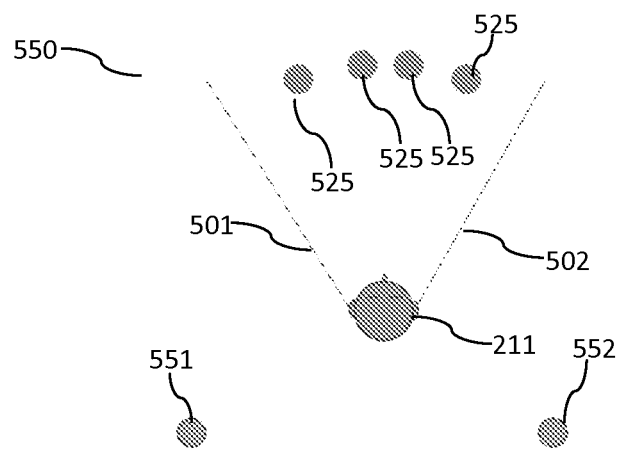

The use of stereo or dual channel music or notifications can be extended further to deliberately place the sounds much further away from the cone 501, 502 of positions used for the voice conference. This would give the impression of actual background music. This could be used to provide some ambience to a multi-party discussion, without disturbing the intelligibility of the talkers in the audio conference. FIG. 5*f* shows an example conference scene 550 with two sound locations 551, 552 at either side of the listener 211. In the illustrated example, the sound locations 551, 552 are positioned behind the listener's head, i.e. at an angle greater than 90° degrees from the midline in front of the listener's head.

Figure 5G:
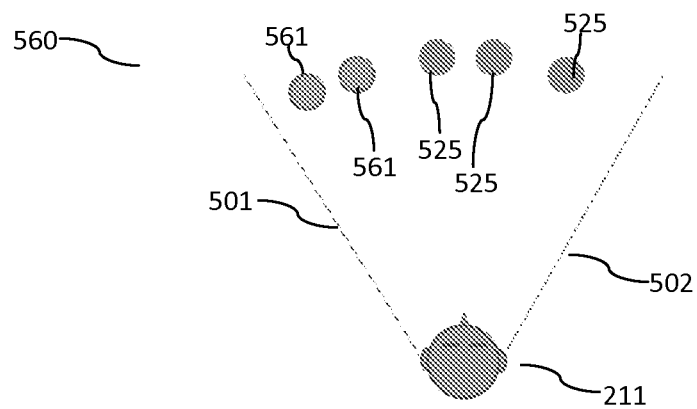
Figure 5H:
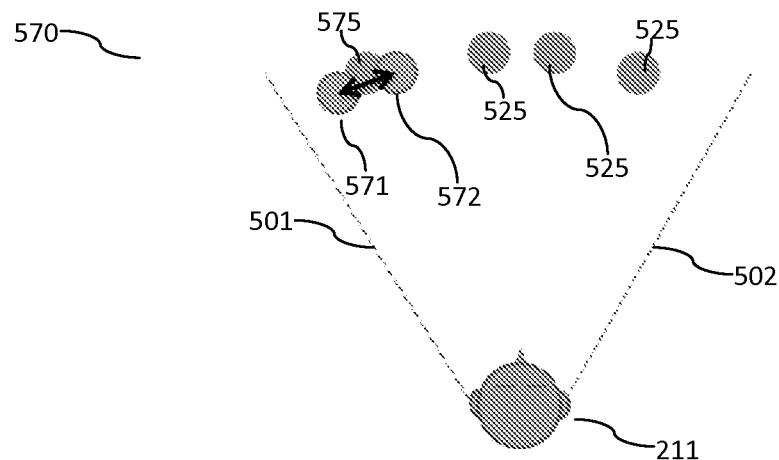
Figure 5I:
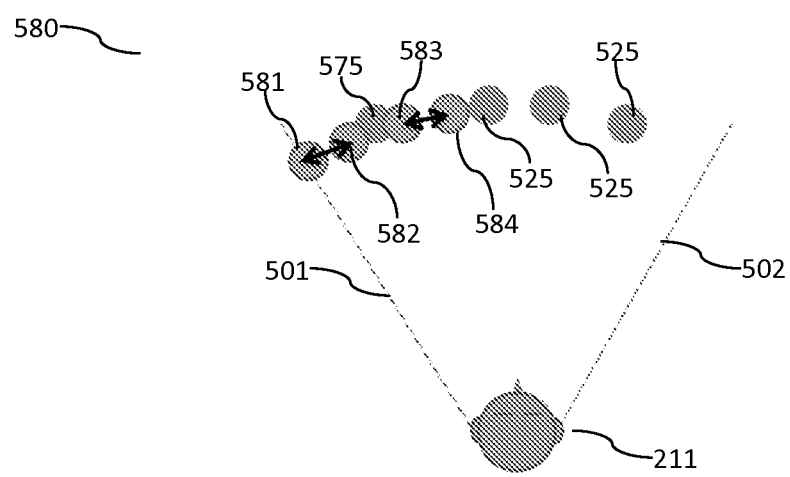

System sounds that are mono can be given some spatial spread in order to allocate a wider area of the spatial scene. This can be accomplished by allocating the same mono sound to adjacent locations within the scene. This is illustrated in the conference scene 560 of FIG. 5*g*, where the system sound is provided with two spatial locations 561. Furthermore, the width of the notification sound location 561 within the scene 560 can be dynamically changed in order to highlight a specific talker within the scene 560. An example of this is shown in the conference scene 570 of FIG. 5*h*, where the talker location 575 is surrounded by the sound locations 571, 572. As a result, the talker is "surrounded" by the notification sound, e.g. by alternately panning from one side of the talker to the other side. This may be used to particularly emphasize an event or a characteristic (e.g. chairperson) of the talker at the talker location 575. An additional example for emphasizing a talker within the scene using the notification sound is shown in the conference scene 580 of FIG. 5*i*, where the talker location 575 is encompassed by two widened sound notifications rendered at the sound locations 581, 582, 583, 584. A notification sound is placed on either side of a talker within the scene 580. The locations 581, 582, 583, 584 of the notification sound may be dynamically altered in unison to highlight the talker at location 575. By way of example, the sound notifications may be panned between the different sound notifications, thereby increasing and decreasing the perceived width of the notification sound.

The description illustrates how conference scenes may be managed for a binaural headphone listening configuration. A similar logic may be applied to a loudspeaker rendering system, by specific placement of sounds in the auditory conference scene. It should be noted that although the scenes described in FIGS. 5 and 6 are based on an auditory cone of locations, the logic and placement of sound sources is not restricted to such a cone. It is noted that sounds could be spatialised to any location around a listener 211. In particular, the sound signals may be spatialised to sound locations at inclination angles greater/smaller than zero degrees. In other words, the sound signals may be placed at one or more layers above or below the listener 211.

In the context of FIGS. 5 and 6 various placement schemes for placing sound signals into a conference scene have been described. These placement schemes are directed at providing a spatial separation between the sound signals and the voice signals of an audio conference, in order to reduce the disturbance of the voice conversation between the participants caused by the sound signals, while at the same time ensuring that the sound signals are identified by a listener. Alternatively or in addition to an appropriate placement of sound signals within the conference scene, the sound signals may be adapted, in order to reduce the risk for spectral masking of the voice signals caused by the sound signals. In particular, system sounds that are more musical in content can be spectrally enhanced such that the system sounds cause less masking to the active speech signals, even if the system sounds were placed at a spatial location that coincides with an active talker. The spectral enhancement of the system sounds may comprise emphasizing spectral bands of the sound signal that are likely to cause less conflict with the voice signals, and/or attenuating spectral bands of the sound signal that are likely to cause conflict with the voice signals. For example, the voice and sound signals could be transformed into the frequency domain, such that they are represented as a set of time-frequency components. The corresponding time slices of frequency content for the voice signals and sound signals could be analyzed, in real time, to identify the dominant signal at each frequency tile. The frequency tiles which contain a significantly dominant component of the sound signal e.g. where there is little or no speech information, could be increased in level to emphasize the sound signal, without affecting the dominant component of the voice signal. Hence, by adapting the spectral composition of a sound signal (e.g. a notification sound) based on the spectral composition of the one or more voice signals in the conference scene, the disturbing impact of a sound signal on the conversation within an audio conference can be reduced.

It should be noted that when adjusting the spectral composition of a sound signal, the generation of a binaural signal which reflects the spatial location of the sound signal may be impacted. Typically, for binaural signals, the left and right ear channels of audio should be considered together in terms of adjusting the level of individual time-frequency tiles. Otherwise, the interaural level differences for a sound source could be altered in a way that changes the perceived spatial location of the sound signal.

A further measure for reducing a disturbing impact of a sound signal (e.g. a notification) on the audio-conference may be to align the timing of the sound signals to the talker activity within the conference. In other words, the timing of the notification sounds may be adapted to provide less impairment to the audio scene. For example, it may be beneficial to wait for a gap in the active talker speech to play a new joiner notification. This could be subjected to a waiting time threshold of e.g. a few seconds, meaning that after elapse of a maximum waiting time, the notification (regarding e.g. the new joiner) would be inserted into the conference, regardless of the actual talker activity. The approach of selecting an appropriate moment for entering a conference is similar to entering a real room where a meeting is in progress. The joining participant may wait for a convenient break in the discussion before entering the conference and causing a disturbing interruption. While the joining participant is waiting for the appropriate gap, the conferencing server may provide the joint participant with an information audio stream, for example "we are waiting for a convenient moment for you to join the meeting". By doing this, the joining participant is made aware why there is a delay.

In the present document, various aspects for managing a 2D or 3D scene of an audio conference have been described. The aspects may be provided in the context of an API (Application Programming Interface) or a GUI (Graphical User Interface), in order to allow developers of a voice conference system or users of a voice conference system to manage the placement of voice signals (originating from the different conference participants) and/or sound signals (e.g. notifications, voice prompts, music) into a conference scene. The present document provides rules and logic which may be used by a scene manager to define pre-determined X-point scenes and/or to automatically position talkers and/or sounds within the conference scene. The scene manager may be configured to use device specific spatial locations (e.g. terminal specific locations within the scene) and/or device specific X-point scenes, which may be different depending on whether the scene is being rendered by headphones or by loudspeakers.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A conference controller configured to place an upstream audio signal associated with a conference participant and a sound signal within a 2D or 3D conference scene to be rendered to a listener, wherein the upstream audio signal comprises a speech signal of the conference participant, and wherein the conference controller is configured to
   set up a X-point conference scene with X different spatial talker locations within the conference scene, X being an integer, X>0;
   assign the upstream audio signal to one of the talker locations;
   place a sound signal at a spatial sound location within the X-point conference scene; wherein the sound signal relates to a system sound generated by the conference controller and comprises a notification, an announcement and/or music;
   perform a spectral analysis of the upstream audio signal and the sound signal, wherein the spectral analysis includes analyzing corresponding time slices of frequency content for the upstream audio signal and the sound signal in real time; and
   modify a spectral composition of the sound signal based on the spectral analysis, in order to reduce a spectral masking of the upstream audio signal due to the sound signal, wherein modifying the spectral composition of the sound signal involves, based on a spectral composition of the upstream audio signal, emphasizing spectral bands of the sound signal that are likely to cause less conflict with the upstream audio signal and/or attenuating spectral bands of the sound signal that are likely to cause conflict with the upstream audio signal; and
   generate metadata identifying the assigned talker location and the spatial sound location and enabling an audio processing unit to generate a spatialized audio signal based on a set of downstream audio signals comprising the upstream audio signal and the sound signal; wherein when rendering the spatialized audio signal to the listener, the listener perceives the upstream audio signal as coming from the assigned talker location and the sound signal as coming from the sound location.

2. The conference controller of claim 1, wherein the X talker locations are positioned within a cone around a midline in front of a head of the listener; wherein a generatrix of the cone and the midline form an angle which is smaller than or equal to a pre-determined maximum cone angle.

3. The conference controller of claim 1, wherein the conference controller is configured to generate a tag comprised within the metadata, wherein the tag enables the audio processing unit to
   identify the sound signal from the set of downstream audio signals received at the audio processing unit,
   identify a sound type of the sound signal; and
   process the sound signal in accordance to the sound type, wherein
   the tag enables the audio processing unit to select a decoder in accordance to the sound type.

4. The conference controller of claim 1, wherein
   the sound signal comprises waiting music; and
   the conference controller is configured to place the sound signal within
   the X-point conference scene, prior to assigning any upstream signal to one of the X talker locations.

5. The conference controller of claim 1, wherein the sound location corresponds to one of the X talker locations, wherein
   the sound signal is associated with the upstream audio signal; and
   the sound location corresponds to the talker location of the upstream audio signal, and wherein
   the sound signal indicates an entry of the upstream audio signal into the conference scene; or
   the sound signal indicates an interruption of the upstream audio signal.

6. The conference controller of claim 5, wherein
   the sound signal comprises a notification sound; and
   the conference controller is configured to place the sound signal to a first talker location from the talker locations, prior to assigning the upstream signal to the first talker location.

7. The conference controller of claim 1, wherein
   two adjacent talker locations of the X talker locations are separated by at least a minimum angular distance;
   the minimum angular distance is 5° degrees or more; and
   the sound location is separated from any of the X talker locations by at least the minimum angular distance.

8. The conference controller of claim 2, wherein the sound location is positioned outside of the cone around the midline in front of the head of the listener.

9. The conference controller of claim 8, wherein the conference controller is configured to assign the sound signal to at least two sound locations at both sides outside of the cone around the midline in front of the head of the listener.

10. The conference controller of claim 1, wherein the conference controller is configured to classify the X spatial talker locations into a plurality of clusters;
wherein a first of the plurality of clusters comprises at least two spatial talker locations; wherein the spatial talker locations comprised within the first cluster are directly adjacent, wherein the conference controller is configured to assign the signal sound to a plurality of sound locations within the X-point conference scene; wherein the plurality of sound locations are associated with the spatial talker locations comprised within the first cluster.

11. The conference controller of claim 2, wherein the conference controller is configured to assign the sound signal to at least two sound locations; wherein the at least two sound locations are positioned within the cone around the midline in front of the head of the listener, wherein the at least two sound locations surround one of the spatial talker positions, and wherein
the conference controller is configured to
pan the sound signal between the at least two sound locations; and
increase or decrease the level of the sound signal.

12. The conference controller of claim 11, wherein
the at least two sound locations comprise pairs of sound locations at both sides of the one of the spatial talker positions; and
the conference controller is configured to modify a pan of the sound signal within the pairs of sound locations, thereby modifying a perceived width of the sound signal.

13. The conference controller of claim 1, wherein the conference controller is configured to
determine a degree of activity of the upstream audio signal; and
delay a rendering of the signal sound if the degree of activity is above a pre-determined activity level.

14. The conference controller of claim 1, wherein
the conference scene is a 3D conference scene; and
the spatial sound location is located at an azimuth and/or inclination angle different to zero degrees with respect to the midline.

15. The conference controller of claim 2, wherein the conference controller is configured to calculate the X-point conference scene with X different spatial talker locations such that the X talker locations are positioned within the cone around the midline in front of the head of the listener.

16. The conference controller of claim 1, wherein the conference controller is configured to select the X-point conference scene with X different spatial talker locations from a set of pre-determined X-point conference scenes with X different pre-determined spatial talker locations.

17. An audio conferencing system, comprising
a talker terminal configured to generate an upstream audio signal associated with a conference participant;
a conference controller according to claim 1, configured to assign the upstream audio signal to a talker location and assign a sound signal to a sound location within a 2D or 3D conference scene and configured to generate metadata identifying the assigned talker location and the sound location; and
a listener terminal configured to render the upstream audio signal and the sound signal to a listener using the metadata, such that the listener perceives the upstream audio signal as coming from the assigned talker location and the sound signal as coming from the sound location.

18. A method performed by a processor for placing an upstream audio signal associated with a conference participant and a sound signal within a 2D or 3D conference scene to be rendered to a listener, wherein the upstream audio signal comprises a speech signal of the conference participant, and wherein the method comprises
setting up a X-point conference scene with X different spatial talker locations within the conference scene, X being an integer, X>0;
assigning the upstream audio signal to one of the talker locations (212);
assigning a sound signal to a spatial sound location within the X-point conference scene; wherein the sound signal relates to a system sound generated by the conference controller and comprises a notification, an announcement and/or music;
performing a spectral analysis of the upstream audio signal and the sound signal, wherein performing the spectral analysis includes analyzing corresponding time slices of frequency content for the upstream audio signal and the sound signal in real time;
modifying a spectral composition of the sound signal based on the spectral analysis, in order to reduce a spectral masking of the upstream audio signal due to the sound signal, wherein modifying the spectral composition of the sound signal involves, based on a spectral composition of the upstream audio signal, emphasizing spectral bands of the sound signal that are likely to cause less conflict with the upstream audio signal and/or attenuating spectral bands of the sound signal that are likely to cause conflict with the upstream audio signal; and
generating metadata identifying the assigned talker location and the spatial sound location and enabling an audio processing unit to generate a spatialized audio signal based on a set of downstream audio signals comprising the upstream audio signal and the sound signal; wherein when rendering the spatialized audio signal to the listener, the listener perceives the upstream audio signal as coming from the assigned talker location and the sound signal as coming from the sound location.

19. A software program adapted for execution on a processor and for performing the method steps of claim 18 when carried out on the processor.

* * * * *